(12) United States Patent
Stimpson et al.

(10) Patent No.: US 11,050,871 B2
(45) Date of Patent: **\*Jun. 29, 2021**

(54) STORING MESSAGES

(71) Applicant: Sorenson IP Holdings, LLC, Salt Lake City, UT (US)

(72) Inventors: Michael Stimpson, Taylorsville, UT (US); Brian Chevrier, Highland, UT (US)

(73) Assignee: Sorenson IP Holdings, LLC, Salt Lake City, UT (US)

( \* ) Notice: Subject to any disclaimer, the term of this patent is extended or adjusted under 35 U.S.C. 154(b) by 42 days.

This patent is subject to a terminal disclaimer.

(21) Appl. No.: 15/980,618

(22) Filed: May 15, 2018

(65) Prior Publication Data
US 2018/0288206 A1 Oct. 4, 2018

Related U.S. Application Data

(63) Continuation of application No. 15/476,471, filed on Mar. 31, 2017, now Pat. No. 9,992,318.

(51) Int. Cl.
*H04M 1/64* (2006.01)
*H04M 1/65* (2006.01)
(Continued)

(52) U.S. Cl.
CPC ..... *H04M 1/6505* (2013.01); *H04M 3/42391* (2013.01); *H04M 1/2475* (2013.01);
(Continued)

(58) Field of Classification Search
CPC ......... H04M 1/6505; H04M 2203/301; H04M 2201/60; H04M 2203/4536; H04M 3/42391; H04M 1/2475; H04M 1/656
See application file for complete search history.

(56) References Cited

U.S. PATENT DOCUMENTS 5,644,627 A \* 7/1997 Segal ..................... G08B 3/105
340/7.23
5,778,053 A \* 7/1998 Skarbo .................. H04M 11/10
348/14.06
(Continued)

FOREIGN PATENT DOCUMENTS

| EP | 0485900 B1 | 8/1995 |
|---|---|---|
| JP | H05199295 A | 8/1993 |
| JP | 2592905 B2 | 3/1997 |

*Primary Examiner* — Solomon G Bezuayehu
(74) *Attorney, Agent, or Firm* — Maschoff Brennan

(57) ABSTRACT

A computer-implemented method to store messages is disclosed. The method may include obtaining a minimum message length for stored messages. The minimum message length may be greater than zero. The method may further include determining an amount of available storage space allocated for storage of user messages on a computer-readable medium. The method may also include, in response to a communication session not being established between a user of a first communication device and a second communication device and in response to the amount of available storage space being greater than zero but being insufficient to store the minimum message length, not storing a user message and providing an indication that there is no available storage space.

20 Claims, 16 Drawing Sheets

(51) Int. Cl.
  *H04M 3/42* (2006.01)
  *H04M 1/247* (2021.01)
(52) U.S. Cl.
  CPC .. *H04M 2201/60* (2013.01); *H04M 2203/301* (2013.01); *H04M 2203/4536* (2013.01)

(56) References Cited

U.S. PATENT DOCUMENTS

| | | | |
|---|---|---|---|
| 5,903,627 A * | 5/1999 | Shaffer | H04M 3/53 379/67.1 |
| 5,999,525 A | 12/1999 | Krishnaswamy et al. | |
| 6,111,938 A | 8/2000 | Katoh | |
| 6,181,784 B1 * | 1/2001 | Duran | H04M 3/42221 348/14.06 |
| 6,275,569 B1 | 8/2001 | Cannon | |
| 6,330,702 B1 * | 12/2001 | King | G06F 7/026 714/819 |
| 6,909,708 B1 | 6/2005 | Krishnaswamy et al. | |
| 6,944,440 B1 | 9/2005 | Kim | |
| 2001/0046282 A1 * | 11/2001 | Bailey, III | H04L 67/02 379/93.25 |
| 2002/0160751 A1 * | 10/2002 | Sun | H04M 1/6505 455/412.1 |
| 2005/0105700 A1 * | 5/2005 | Kim | H04M 1/72433 379/88.22 |
| 2006/0233319 A1 | 10/2006 | Van Zandt et al. | |
| 2008/0095339 A1 | 4/2008 | Elliott et al. | |
| 2008/0198982 A1 * | 8/2008 | Hernandez | H04M 3/42059 379/88.19 |
| 2010/0257328 A1 * | 10/2010 | Liu | G06F 3/0655 711/162 |
| 2011/0117849 A1 * | 5/2011 | Inagaki | H04W 12/50 455/41.2 |
| 2013/0329868 A1 * | 12/2013 | Midtun | G10L 15/26 379/88.14 |
| 2015/0109996 A1 * | 4/2015 | Lee | H04L 27/38 370/328 |
| 2015/0268907 A1 * | 9/2015 | Ishijima | G06K 15/1823 358/1.15 |
| 2016/0092568 A1 * | 3/2016 | Barzik | G06F 16/285 707/722 |

* cited by examiner

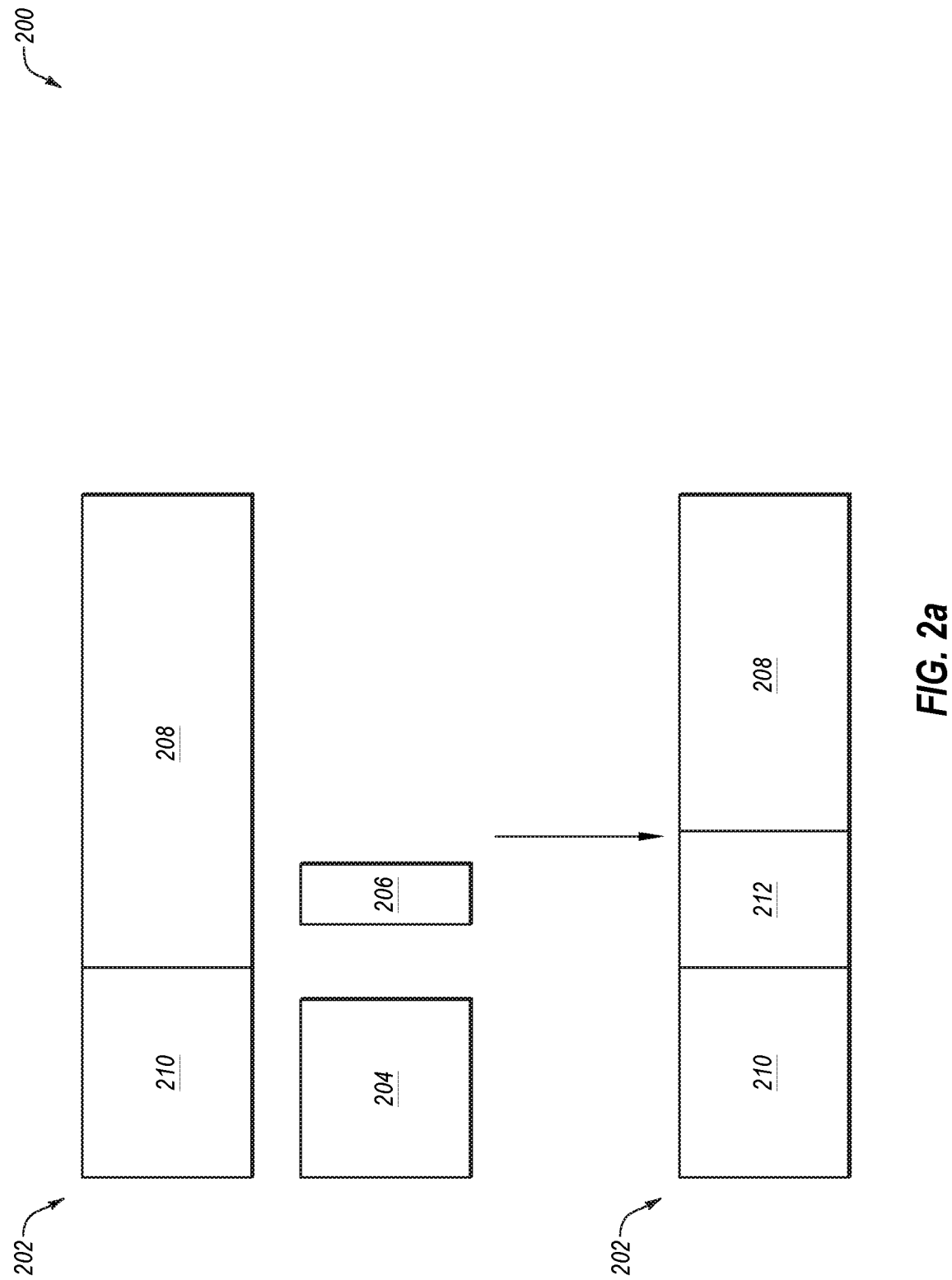

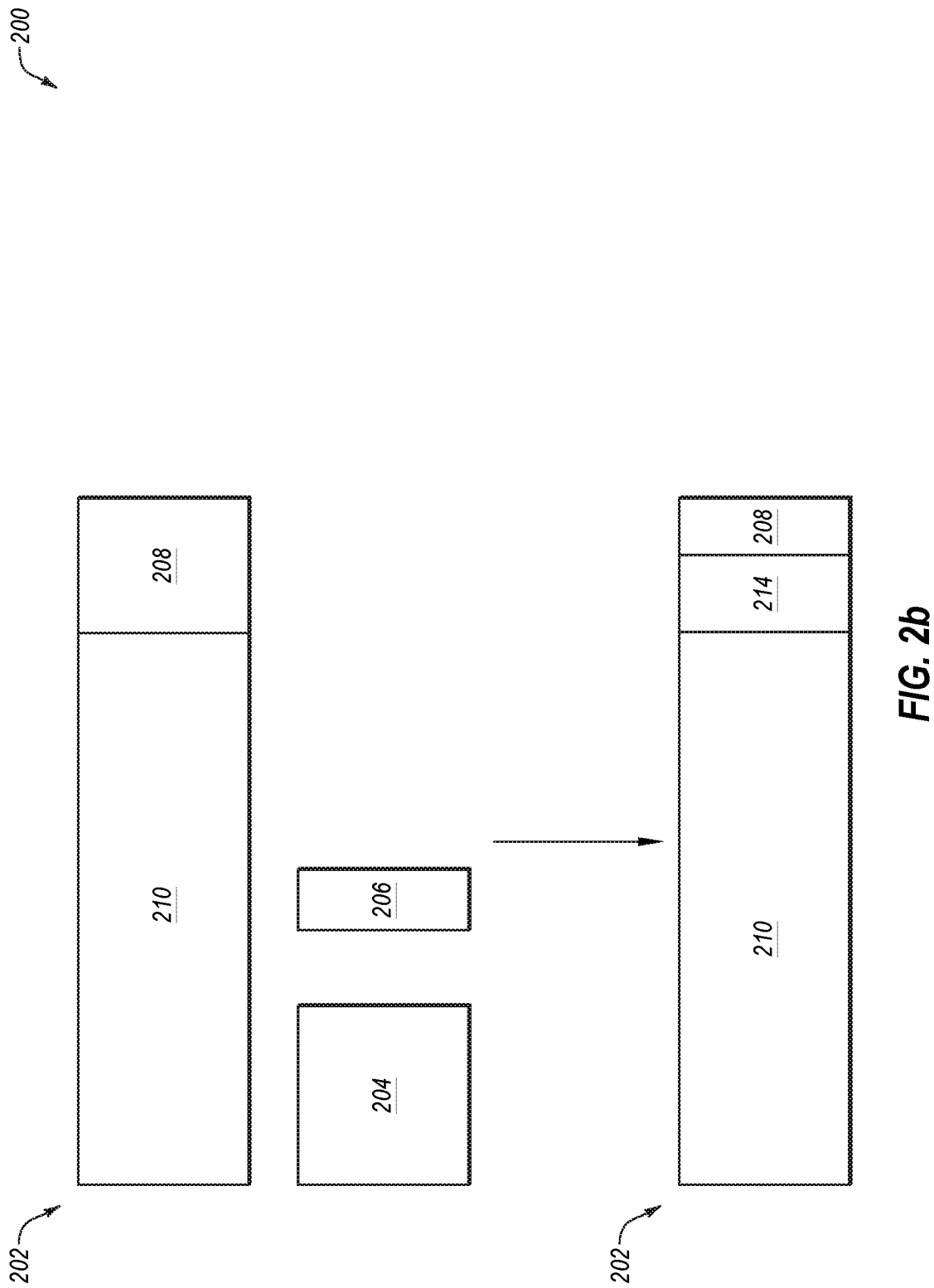

STORING MESSAGES

CROSS-REFERENCE TO RELATED APPLICATION

This application is a continuation of U.S. patent application Ser. No. 15/476,471, filed on Mar. 31, 2017, the disclosure of which is incorporated herein by reference.

FIELD

The embodiments discussed herein are related to storing messages.

BACKGROUND

Modern telecommunication services provide features to assist those who are deaf or hearing-impaired. One such feature is a text captioned telephone system for the hearing impaired. A text captioned telephone system may be a telecommunication intermediary service that is intended to permit a hearing-impaired user to utilize a normal telephone network.

The subject matter claimed herein is not limited to embodiments that solve any disadvantages or that operate only in environments such as those described above. Rather, this background is only provided to illustrate one example technology area where some embodiments described herein may be practiced.

SUMMARY

A computer-implemented method to store messages is disclosed. The method may include obtaining a minimum message length for stored messages. The minimum message length may be greater than zero. The method may further include determining an amount of available storage space allocated for storage of user messages on a computer-readable medium. The method may also include, in response to a communication session not being established between a user of a first communication device and a second communication device and in response to the amount of available storage space being greater than zero but being insufficient to store the minimum message length, not storing a user message and providing an indication that there is no available storage space.

BRIEF DESCRIPTION OF THE DRAWINGS

Example embodiments will be described and explained with additional specificity and detail through the use of the accompanying drawings in which:

FIGS. 2a-2c illustrate a schematic diagram illustrating an example storage space allocated for storage of audio messages, a first message length, and a second message length;

DESCRIPTION OF EMBODIMENTS

Figure 1:
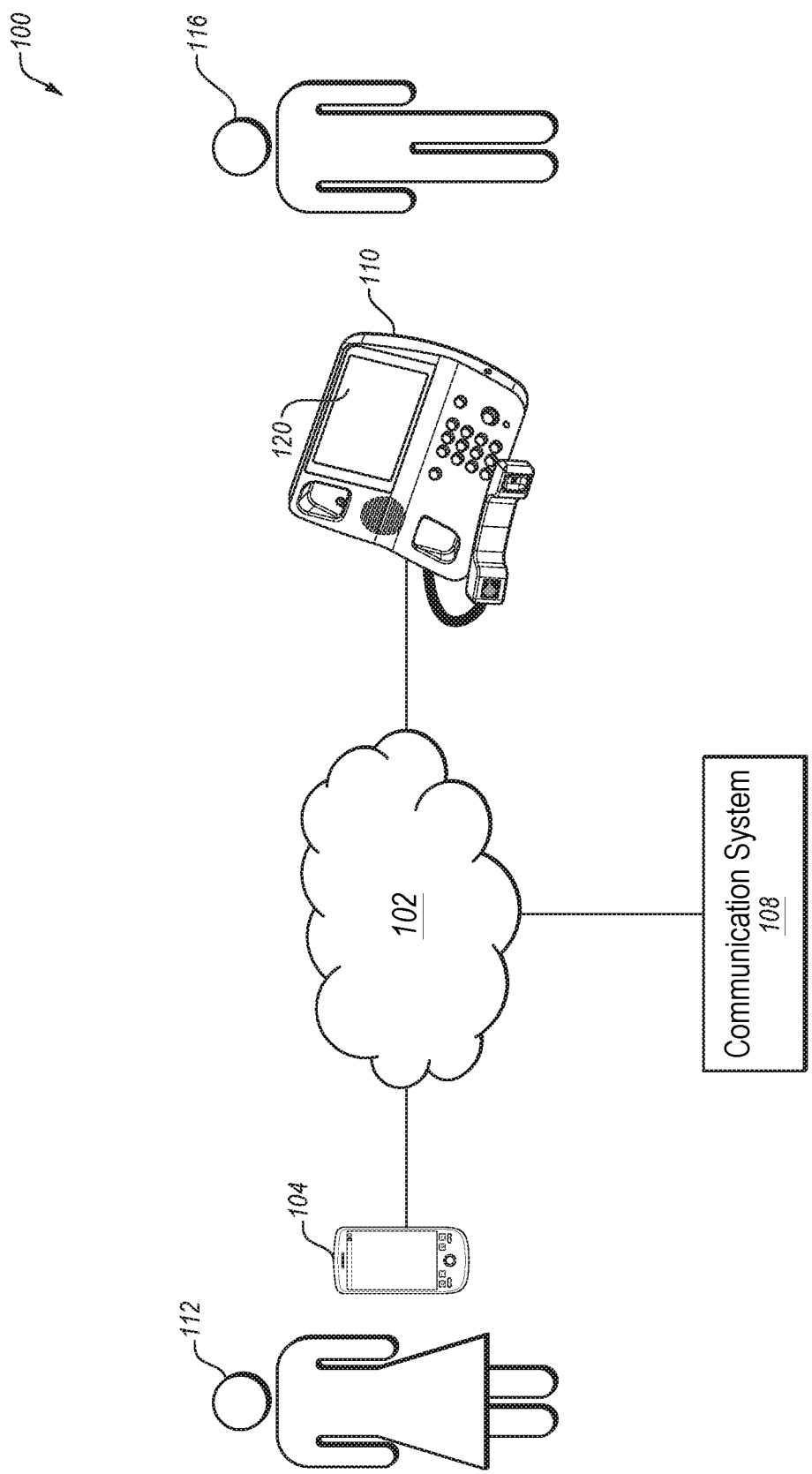
FIG. 1 illustrates an example environment that includes an example communication device that may store messages.

Some embodiments in this disclosure relate to a method and/or system that may store messages on a computer-readable medium. For example, a device, such as a communication device, may receive requests for communication sessions and establish communication sessions in response to user input. In some embodiments, a communication session with a user of the device may not be established when a communication session is requested. For example, a user of the device may not be available to participate in a communication session. In these and other embodiments, a communication session between the device and a second device may be established even though a communication session between a user of the device and the second device may not be established. In these and other embodiments, the device may be configured to store a message in response to the communication session with the user not being established. For example, the device may store a message from a second user for the user of the device.

In some embodiments, the device may include a computer-readable medium with storage space allocated for storage of messages. Some of the storage space may be available storage space and some of the storage space may be occupied by currently stored messages. In these and other embodiments, the device may determine an amount of available storage space allocated for storage of messages on the computer-readable medium. Based on the available storage space, the device may allow messages to be stored or may not allow messages to be stored.

In some embodiments, the device may be configured to either store a message or not store a message based on one or more factors with respect to the available storage space. For example, the device may be configured to store a message when the amount of available storage space is sufficient to store a message of at least a first length and may not store the message when the amount of available storage space allocated for storage of messages is insufficient to store a message of at least the first length, even when a message of some length less than the first length may be stored. Alternatively or additionally, in some embodiments, the device may be configured to allow a message of a second length to be stored in response to the computer-readable medium having any available storage space, even if the available storage space allocated for storage of messages is insufficient to store a message of the second length.

In short, in some embodiments, the device may be configured so that if a message is allowed to be stored, there is sufficient storage space available for storage of a message long enough to convey adequate detail for the user of the device. As a result, the device may avoid situations where a person starts to leave a message but is cut off because the available storage space is inadequate for the message. For example, situations where a person may only be able to leave a message of five or ten seconds and is cut-off mid-sentence thereby leaving an incomplete message for a user of the device.

In some embodiments, the systems and/or methods described in this disclosure may thus help to enable the storage of a message on a user device or other devices. Thus, the systems and/or methods provide at least a technical solution to a technical problem associated with the design of user devices in the technology of telecommunications.

FIG. 1 illustrates an example environment 100 that includes an example system that may store a message on a computer-readable medium. The environment 100 may be arranged in accordance with at least one embodiment described in the present disclosure. The environment 100 may include a network 102, a first communication device 104, a communication system 108, and a second communication device 110.

The network 102 may be configured to communicatively couple the first communication device 104, the communication system 108, and the second communication device 110. In some embodiments, the network 102 may be any network or configuration of networks configured to send and receive communications between systems and devices. In some embodiments, the network 102 may include a wired network or wireless network, and may have numerous different configurations. In some embodiments, the network 102 may also be coupled to or may include portions of a telecommunications network, including telephone lines such as a public switch telephone network (PSTN) line, for sending data in a variety of different communication protocols, such as a protocol used by a plain old telephone system (POTS).

Each of the first communication device 104 and the second communication device 110 may be any electronic or digital computing device. For example, each of the first communication device 104 and the second communication device 110 may include a desktop computer, a laptop computer, a smartphone, a mobile phone, a tablet computer, a telephone, a phone console, or any other computing device. In some embodiments, each of the first communication device 104 and the second communication device 110 may be configured to establish communication sessions with other devices. For example, each of the first communication device 104 and the second communication device 110 may be configured to establish an outgoing telephone call with another device over a telephone line or communication network. For example, the first communication device 104 may communicate over a wireless cellular network and the second communication device 110 may communicate over a PSTN line. Alternatively or additionally, the first communication device 104 and the second communication device 110 may communicate over other wired or wireless networks that do not include or only partially include a PSTN. For example, a telephone call or communication session between the first communication device 104 and the second communication device 110 may be a Voice over Internet Protocol (VoIP) telephone call. Alternately or additionally, each of the first communication device 104 and the second communication device 110 may be configured to communicate with other systems over a network, such as the network 102 or another network. In these and other embodiments, the first communication device 104 and the second communication device 110 may receive data from and send data to the communication system 108.

In some embodiments, the first communication device 104 and the second communication device 110 may each include memory and at least one processor, which are configured to perform operations as described in this disclosure, among other operations. In some embodiments, the first communication device 104 and the second communication device 110 may include computer-readable instructions that are configured to be executed by the first communication device 104 and the second communication device 110 to perform operations described in this disclosure.

In some embodiments, the second communication device 110 may be configured to store a message in response to a communication session not being established between another device, such as the first communication device 104, and the user 116 of the second communication device 110. For example, the user 112 may place a call from the first communication device 104 directed to the second communication device 110. In some embodiments, a communication session between the first communication device 104 and the second communication device 110 may be established without the user 116 being a participant in the communication session. In these and other embodiments, a communication session between the second communication device 110 and the first communication device 104 may be established after a duration of time in response to the user 116 not interacting with the second communication device 110 or the user 116 declining to answer a communication request placed from the first communication device 104 and sent to the second communication device 110.

In some embodiments, the user 112 of the first communication device 104 may be presented with an audio signal indicating that the user 116 of the second communication device 110 is unavailable. In these and other embodiments, the user 112 of the first communication device 104 may attempt to leave a message for the user 116 of the second communication device 110. A message may include audio or video data. In some embodiments, the message may be an audio message including voice data generated by a user, such as the user 112 of the first communication device 104. In some embodiments, the message may be a video message. In these and other embodiments, video data may include audio data.

The second communication device 110 may be configured to determine whether the user 112 may leave a message for the user 116. The second communication device 110 may determine whether the user 112 may leave a message based on the storage space available where the message may be stored.

In some embodiments, to determine if a message may be left, the second communication device 110 may first obtain a first message length for stored messages and a second message length for stored messages. In some embodiments, the first message length and the second message length may be obtained from the communication system 108 via the network 102. Alternatively or additionally, one or more of the first message length and the second message length may be selected by the user 116 of the second communication device 110. Alternatively or additionally, the one or more of the first message length and the second message length may be stored on the computer-readable medium of the second communication device 110.

The first message length and the second message length may be lengths of time for stored messages. In some embodiments, the first message length and the second message length may both be greater than zero and the first message length may be longer than the second message length. For example, in some embodiments, the first message length may be a period of three minutes and the second message length may be a period of one minute. In some embodiments, the first message length may be a maximum message length for messages stored on a computer-readable medium of the second communication device 110. For example, each message stored on the computer-readable medium may be limited to the first message length, for example three minutes or fewer. The second message length may be a threshold message length. For example, if the computer-readable medium does not have sufficient available storage space to store the second message length, a message may not be stored on the computer-readable medium, even if the computer-readable medium has sufficient available storage space to store a message of shorter duration.

In some embodiments, to determine if a message may be left, the second communication device 110 may also be configured to determine an amount of available storage space allocated for storage of messages on the computer-readable medium. The amount of storage space allocated for storage of messages on the computer-readable medium may be less than the total amount of storage space on the computer-readable medium. For example, in some embodiments, the computer-readable medium may be configured to store different data and files. In some embodiments, the computer-readable medium may be a cloud-based computer readable medium and may store messages associated with multiple communication devices. The second communication device 110 may be configured to limit or not allow a message to be stored on the computer-readable medium based on the amount of available storage space allocated for storage of messages on the computer-readable medium.

If the amount of available storage space is sufficient to store the first message length, in this example three minutes, then a message may be stored up to the first message length. For example, the user 112 may leave a message up to three minutes in length. If the amount of available storage space is insufficient to store the first message length but sufficient to store the second message length, in this example one minute, then a message may be stored up to the amount of available storage space. For example, the stored message may be any length less than the first message length of three minutes and may not take up more space than the available storage space. For example, if the amount of available storage space is two minutes, a message up to two minutes in length may be stored. If the amount of available storage space is greater than zero, meaning that there is space on the computer-readable medium allocated to storage of messages, but is insufficient to store the second message length, a message may not be stored. For example, if the available storage space is sufficient to store a message of forty seconds in length, the second communication device 110 may not store a message and may provide an indication that there is no available storage space even though there is available storage space for a message of forty seconds in length.

In some embodiments, to determine if a message may be left, the second communication device 110 may obtain a maximum storage space allocated for storage of messages. In these and other embodiments, the second communication device 110 may also obtain a maximum message length for stored messages. In some embodiments, the maximum storage space and/or maximum message length may be obtained from the communication system 108 via the network 102. Alternatively or additionally, the maximum storage space and/or maximum message length may be selected by the user 116 of the second communication device 110. Alternatively or additionally, the maximum storage space and/or maximum message length may be stored on the computer-readable medium of the second communication device 110.

The maximum storage space may be an amount of storage space corresponding to storing messages totaling a particular length of time. For example, the maximum storage space may be a storage space sufficient to store sixty minutes of messages. The maximum message length may be a length of time for stored messages. In some embodiments, the maximum message length may be greater than zero. For example, in some embodiments, the maximum message length may be a period of three minutes. The maximum message length may be a maximum message length for messages stored on a computer-readable medium. For example, each message stored on the computer-readable medium may be limited to the maximum message length, for example three minutes or fewer.

An example of determining if a message may be left is now provided. A call may be placed from the first communication device 104 to the second communication device 110. In response to receiving the call from the first communication device 104, a communication session between the first communication device 104 and the user 116 of the second communication device 110 may not be established. However, a communication session between the first communication device 104 and the second communication device 110 may be established to allow the user 112 to send a message to the second communication device 110 for the user 116.

Before or after the communication session is not established, the second communication device 110 may be configured to determine an amount of available storage space allocated for storage of messages on the computer-readable medium and the amount of available storage space allocated for storage of messages. The second communication device 110 may be configured to not allow a message to be stored on the computer-readable medium based on the amount of available storage space allocated for storage of messages on the computer-readable medium.

For example, if the amount of available storage space is greater than zero, meaning that there is space on the computer-readable medium allocated to storage of messages, but is insufficient to store the maximum message length, in this example three minutes, the second communication device 110 may be configured to store a message up to the maximum message length. For example, the stored message may be any length up to the maximum message length of three minutes. As a result, the stored message may take up more storage space than the allocated available storage space. For example, the computer-readable medium may have storage space for 120 minutes of message, but only 60 minutes have been allocated to storage of messages. In these and other embodiments, the stored messages may use more than their allocated 60 minutes of storage space. In short, the stored message may exceed the amount of allocated available storage space. Alternatively, when the amount of available storage space is less than or equal to zero, the second communication device 110 may not store a message and may provide an indication that there is no available storage space.

As described, in some embodiments, the computer-readable medium may not be part of the second communication device 110. In these and other embodiments, the computer-readable medium may be part of the communication system 108. In some embodiments, in response to a communication session not being established between the first communication device 104 and the user 116, a communication session may be established between the first communication device 104 and the second communication device 110. A message from the user 112 may be stored on the computer-readable medium, which may not be part of the second communication device 110. Alternatively or additionally, in some embodiments, a communication session may not established between the first communication device 104 and the second communication device 110 in response to receiving a communication request from the first communication device 104. In response to not establishing a communication session between the first communication device 104 and the second communication device 110, a communication session may be established between the first communication device 104 and a system such as, for example, the communication system 108, to allow the user 112 to leave a message for the user 116. In these and other embodiments, a communication session between the first communication device 104 and the communication system 108 may be established in response to the user 116 not interacting with the second communication device 110 or rejecting a communication request placed from the first communication device 104 to the second communication device 110. Alternatively or additionally, a communication session between the first communication device 104 and the communication system 108 may be established in response to the second communication device 110 being turned off. For example, the second communication device 110 may be off when the communication request is sent from the first communication device 104 to the second communication device 110.

In some embodiments, the communication system 108 may include any configuration of hardware, such as processors, servers, and data storages that are networked together and configured to perform a task. For example, the communication system 108 may include multiple computing systems, such as multiple servers that each include memory and at least one processor, which are networked together and configured to perform operations of storing messages, such as an audio message obtained from another device, on a computer-readable medium associated with the second communication device 110 as described in this disclosure. In these and other embodiments, the communication system 108 may operate to store audio generated by a party using another device, such as the first communication device 104. The communication system 108 may perform similar functions as the second communication device 110 or the same functions as the second communication device 110 when deciding whether to store a message on a computer-readable medium.

In some embodiments, the communication system 108 may also be configured to transcribe communication sessions, such as telephone or video calls, between devices such as the second communication device 110 and another device as described in this disclosure. Alternatively or additionally, the communication system 108 may be configured to transcribe messages, such as an audio message or a video message, stored on a computer-readable medium associated with the second communication device 110 or the communication system 108. In these and other embodiments, the communication system 108 may transcribe audio generated by other devices and not the second communication device 110 or both the second communication device 110 and other devices, among other configurations.

Further, in some embodiments, the environment 100 may be configured to facilitate an assisted communication session between a hearing-impaired user 116 and a second user, such as a user 112. As used in the present disclosure, a "hearing-impaired user" may refer to a person with diminished hearing capabilities. Hearing-impaired users often have some level of hearing ability that has usually diminished over a period of time such that the hearing-impaired user can communicate by speaking, but that the hearing-impaired user often struggles in hearing and/or understanding others.

In some embodiments, the assisted communication session may be in response to a user of the second communication device 110 playing back stored messages. In these embodiments, the second communication device 110 may be a captioning telephone that is configured to present transcriptions of the communication session to the hearing-impaired user 116, such as one of the CaptionCall® 57T model family or 67T model family of captioning telephones or a device running the CaptionCall® mobile app. For example, in some embodiments, the second communication device 110 may include a visual display 120 that is integral with the second communication device 110 and that is configured to present text transcriptions of a communication session to the hearing-impaired user 116.

During a captioning communication session, the communication system 108 and the second communication device 110 may be communicatively coupled using networking protocols. In some embodiments, during the playback of a message, the second communication device 110 may provide the audio signal from a message to the communication system 108 for transcription.

At the communication system 108, the audio signal may be transcribed. In some embodiments, to transcribe the audio signal, a call assistant may listen to the audio signal received from the stored audio message and "revoice" the words of the stored message to a speech recognition computer program tuned to the voice of the call assistant. In these and other embodiments, the call assistant may be an operator who serves as a human intermediary between the hearing-impaired user 116 and the stored message. In some embodiments, text transcriptions may be generated by a speech recognition computer as a transcription of the audio signal of the stored message. The text transcriptions may be provided to the second communication device 110 being used by the hearing-impaired user 116 over the one or more networks 102. The second communication device 110 may display the text transcriptions while the hearing-impaired user 116 listens to a message from the user 112. The text transcriptions may allow the hearing-impaired user 116 to supplement the voice signal received from the message and confirm his or her understanding of the words spoken in the message.

Modifications, additions, or omissions may be made to the environment 100 without departing from the scope of the present disclosure. For example, in some embodiments, the environment 100 may not include the communication system 108.

Figure 2C:
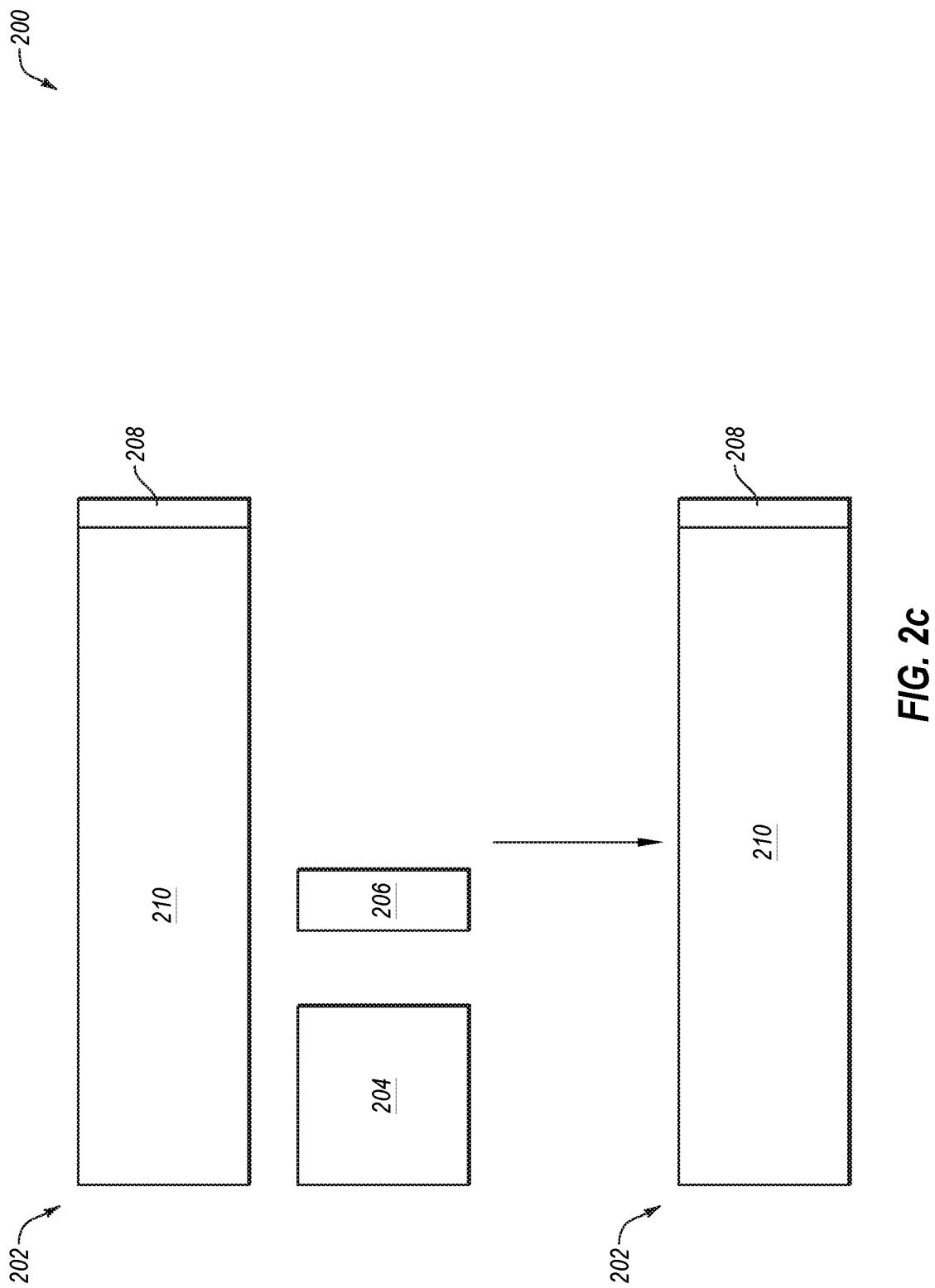

FIGS. 2a-2c illustrate a schematic diagram 200 illustrating an example storage space 202 allocated for storage of audio messages, a first message length, and a second message length. The example storage space 202 may be allocated for storage of messages. The storage space 202 may be part of a computer-readable medium, such as the computer-readable medium discussed above with respect to FIG. 1. In some embodiments, the storage space 202 may be part of a communication device, such as the second communication device 110 of FIG. 1. In some embodiments, the storage space 202 may be part of a communication system, such as the communication system 108 of FIG. 1. In these and other embodiments, other parts of the computer-readable medium may be used for the storage of other data.

The storage space 202 may include sufficient capacity to store messages totaling various lengths, such as 10, 20, 30, 40, 45, 60, 70, 90, 100, or more minutes, among other lengths of time. In these and other embodiments, the storage space 202 and other storage spaces may be discussed in lengths of time. The storage spaces represent actual computer-storage of bytes of information. The length of time of messages that may be stored on a particular amount of computer storage may vary based on the type of message, or compression types, among other factors. A system with a known message and compression type may be able to determine a length of time of a message or messages that may be stored in a particular computer storage amount. Thus, while message length is discussed, the discussion is also applicable to computer storage amounts, such as bytes, bits, or other amounts of computer storage.

The storage space 202 may include an available storage space 208 and a used storage space 210. The used storage space 210 may include the part of the storage space 202 that is currently being used to store audio messages. The available storage space 208 may include the storage space allocated for future storage of audio messages that is not included in the used storage space 210.

The schematic diagram 200 also depicts a first message length 204 and a second message length 206. The first message length 204 and the second message length 206 may be durations of time related to the storage of messages on the storage space 202. The first message length 204 may be a maximum message length for each message stored on the storage space 202 allocated for storage of audio messages. The second message length 206 may be a threshold message length for storage of messages on the storage space 202 allocated for storage of audio messages. In these and other embodiments, the first message length 204 may be longer than the second message length 206. In these and other embodiments, the first message length 204 and the second message length 206 may be greater than zero.

For example, in some embodiments, the first message length 204 may be a length of 0.5, 1.0, 1.5, 2.0, 2.5, 3.0, 3.5, 4.0, or 4.5 minutes, or any other duration of time. In some embodiments, the second message length 206 may be a length of 0.25, 0.5, 0.75, 1.0, 1.5, 2.0, 2.5, 3.0, 3.5, or 4.0 minutes or any other duration of time less than the first message length 204. In these and other embodiments, a message may not be stored on the storage space 202 when the available storage space 208 is less than the second message length 206.

FIG. 2a illustrates a schematic diagram illustrating the example storage space prior to storing a first audio message 212. A communication device associated with the storage space 202 allocated for storage of audio messages may receive a communication request. The communication request may be received from an originating communication device. In response to a communication session not being established between the originating communication device and a user of the communication device associated with the storage space 202, it may be determined if a message may be stored on the storage space 202. FIG. 2a depicts a scenario in which the available storage space 208 is sufficient to store a message of the first message length 204. In response to the available storage space 208 being sufficient to store a message of the first message length 204, the first audio message 212 may be stored on the storage space 202 allocated for storage of audio messages up to the first message length 204. After the first audio message 212 is stored on the storage space 202, the used storage space 210 may be increased by the amount of storage used by the first audio message 212. Similarly, the available storage space 208 may be decreased by the amount of storage used by the first audio message 212.

FIG. 2b illustrates a schematic diagram illustrating the example storage space prior to storing a second audio message 214. For example, FIG. 2b depicts a scenario in which the available storage space 208 is not sufficient to store a message of the first message length 204 but in which the available storage space 208 is sufficient to store a message of the second message length 206. In response to the available storage space 208 being insufficient to store a message of the first message length 204 but sufficient to store a message of the second message length 206, the second audio message 214 may be stored on the storage space 202 allocated for storage of audio messages up to the available storage space 208. After the second audio message 214 is stored on the storage space 202, the used storage space 210 may be increased by the amount of storage used by the second audio message 214. Similarly, the available storage space 208 may be decreased by the amount of storage used by the second audio message 214.

FIG. 2c illustrates a schematic diagram illustrating the example storage space prior to not storing an audio message. For example, FIG. 2c depicts a scenario in which the available storage space 208 is greater than zero but is not sufficient to store a message of the first message length 204 and in which the available storage space 208 is not sufficient to store a message of the second message length 206. In response to the available storage space 208 being greater than zero but insufficient to store a message of the first message length 204 and insufficient to store a message of the second message length 206, an audio message may not be stored on the storage space 202 allocated for storage of audio messages. Even though the available storage space 208 is greater than zero and has sufficient space to store a message of length less than the second message length 206, a message may not be stored.

Modifications, additions, or omissions may be made to the schematic diagram 200 without departing from the scope of the present disclosure. For example, in some embodiments, the storage space may transition from a scenario with less available storage space, such as the scenario depicted in FIG. 2c, to a scenario with more available storage space, such as the scenario depicted in FIG. 2a or 2b. For example, in some embodiments, the storage space may be in the state depicted in FIG. 2c. An audio message may not be stored on the storage space 202. One or more messages stored on the storage space may be deleted from the storage space. After deletion of the messages, the storage space may be in a scenario similar to the scenarios depicted in FIG. 2a or 2b. Messages may be stored on the storage space 202 even though the earlier audio message was not stored on the storage space 202.

Figure 3A:
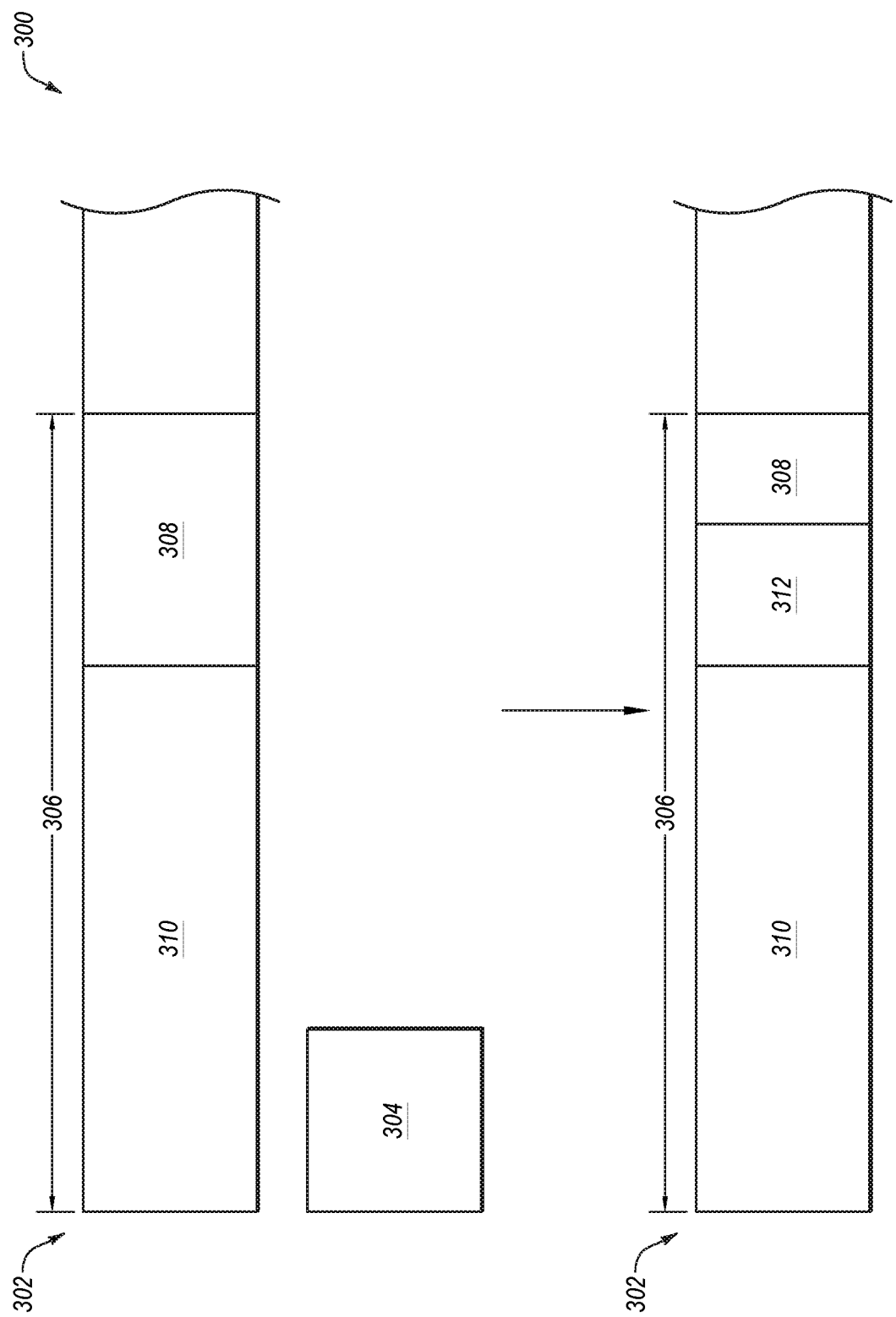
FIGS. 3a-3c illustrate a schematic diagram illustrating an example storage space allocated for storage of messages and a maximum message length.
Figure 3B:
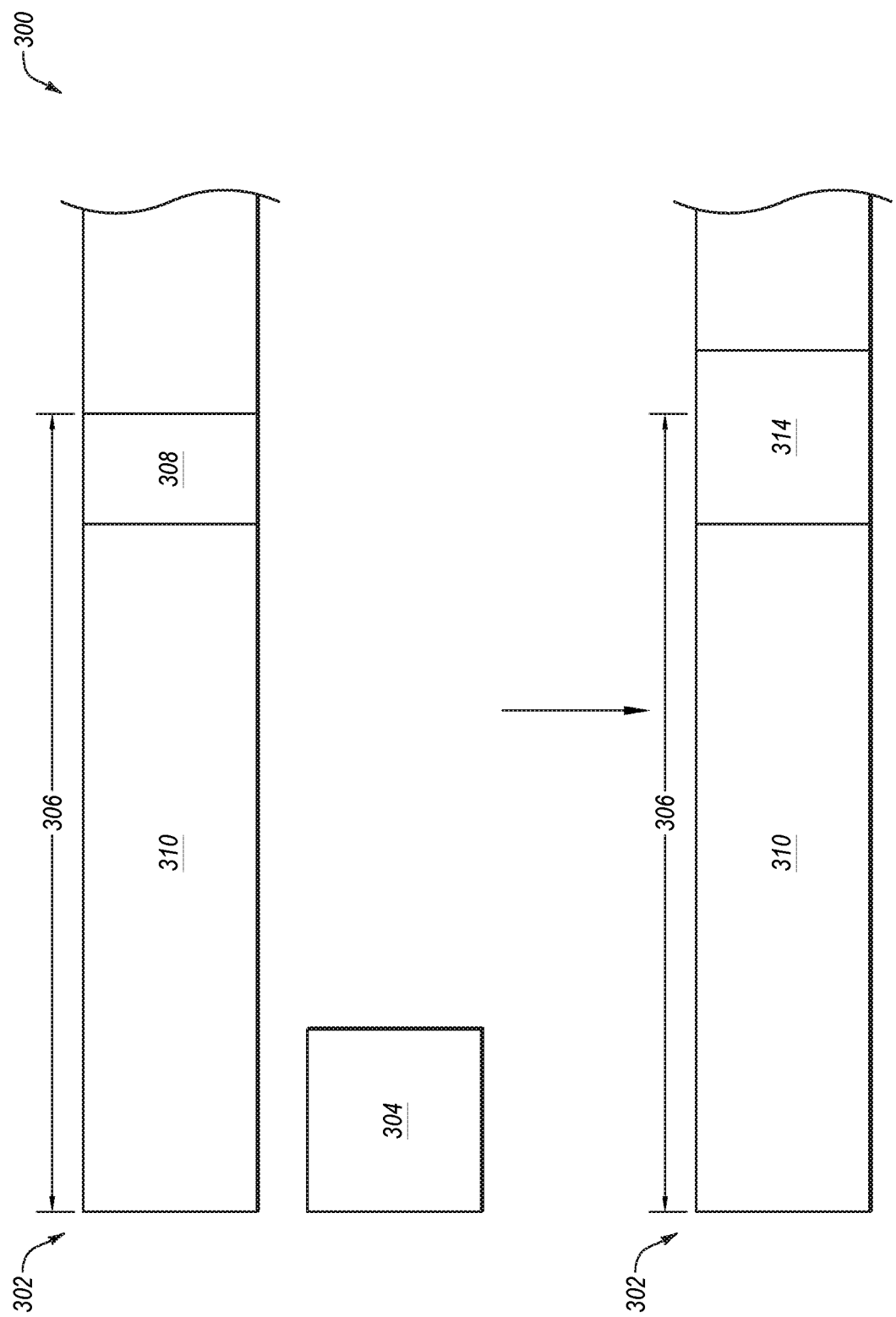
Figure 3C:
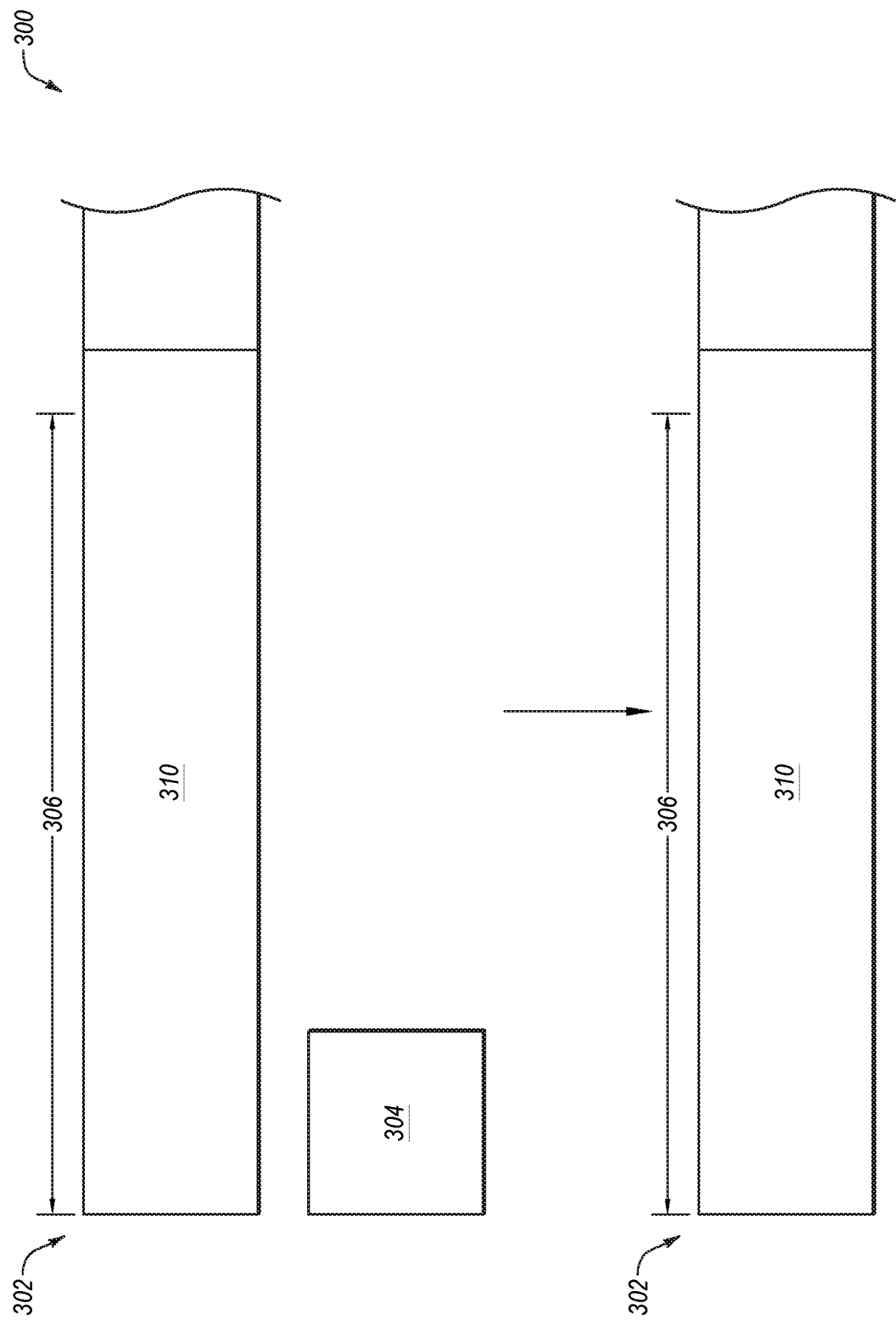

FIGS. 3a-3c illustrate a schematic diagram 300 illustrating an example storage space 302 allocated for storage of messages and a maximum message length. The example storage space 302 may be allocated for storage of messages. The storage space 302 may be part of a computer-readable medium, such as the computer-readable medium discussed above with respect to FIG. 1. In some embodiments, the storage space 302 may be part of a communication device, such as the second communication device 110 of FIG. 1. In some embodiments, the storage space 302 may be part of a communication system, such as the communication system 108 of FIG. 1. In these and other embodiments, other parts of the computer-readable medium may be used for the storage of other data.

The storage space 302 may include a maximum storage space 306. The maximum storage space 306 may include sufficient capacity to store messages totaling various lengths, such as 10, 20, 30, 40, 45, 60, 70, 90, 100, or more minutes, among other lengths of time. In these and other embodiments, the maximum storage space 306 and other storage spaces may be discussed in lengths of time. The storage spaces represent actual computer-storage of bytes of information. The length of time of messages that may be stored on a particular amount of computer storage may vary based on the type of message, compression types, among other factors. A system with a known message and compression type may be able to determine a length of time of a message or messages that may be stored in a particular computer storage amount. Thus, while message length is discussed, the discussion is also applicable to computer storage amounts, such as bytes, bits, or other amounts of computer storage. The storage space 302 may be larger than the maximum storage space 306 as depicted in FIGS. 3a-3c.

The storage space 302 may include an available storage space 308 and currently stored messages 310. The currently stored messages 310 may include the part of the storage space 302 that is currently being used to store messages. The available storage space 308 may include the storage space allocated for future storage of messages that is not included in the currently stored messages 310.

The schematic diagram 300 also depicts a maximum message length 304. The maximum message length 304 may be a duration of time related to the storage of messages on the storage space 302. The maximum message length 304 may be a maximum message length for each message stored on the storage space 302 allocated for storage of messages. Each message stored on the storage space 302 may be limited to a length not longer than the maximum message length 304. In these and other embodiments, the maximum message length 304 may be any length greater than zero.

For example, in some embodiments, the maximum message length 304 may be a length of 0.5, 1.0, 1.5, 2.0, 2.5, 3.0, 3.5, 4.0, or 4.5 minutes, or any other duration of time.

FIG. 3a illustrates a schematic diagram illustrating the example storage space prior to storing a first user message 312. A communication device associated with the storage space 302 allocated for storage of messages may receive a communication request. The communication request may be received from an originating communication device. In response to a communication session not being established between the originating communication device and a user of the communication device associated with the storage space 302, it may be determined if a message may be stored on the storage space 302. FIG. 3a depicts a scenario in which the available storage space 308 is sufficient to store a message of the maximum message length 304. In response to the available storage space 308 being sufficient to store a message of the maximum message length 304, the first user message 312 may be stored on the storage space 302 allocated for storage of messages up to the maximum message length 304. After the first user message 312 is stored on the storage space 302, the currently stored messages 310 may be increased by the amount of storage used by the first user message 312. Similarly, the available storage space 308 may be decreased by the amount of storage used by the first user message 312.

FIG. 3b illustrates a schematic diagram illustrating the example storage space prior to storing a second user message 314. For example, FIG. 3b depicts a scenario in which the available storage space 308 is not sufficient to store a message of the maximum message length 304 but is greater than zero. In response to the available storage space 308 being insufficient to store a message of the maximum message length 304 but being greater than zero, the second user message 314 may be stored on the storage space 302 allocated for storage of messages up to the maximum message length 304. After the second user message 314 is stored on the storage space 302, the currently stored messages 310 may be increased by the amount of storage used by the second user message 314. Similarly, the available storage space 308 may be decreased by the amount of storage used by the second user message 314. In some embodiments, the available storage space 308 may be decreased down to a minimum of zero available storage space. Alternatively or additionally, in some embodiments, the available storage space 308 may be decreased to less than zero.

FIG. 3c illustrates a schematic diagram illustrating the example storage space prior to not storing a user message. For example, FIG. 3c depicts a scenario in which the available storage space 308 is zero or less than zero. In response to the available storage space 308 being zero or less than zero, a message may not be stored on the storage space 302 allocated for storage of messages. Alternatively or additionally, FIG. 3c depicts a scenario in which the currently stored messages 310 exceed the maximum storage space 306. In response to the currently stored messages 310 exceeding the maximum storage space 306, a message may not be stored on the storage space 302 allocated for storage of messages.

Figure 4:
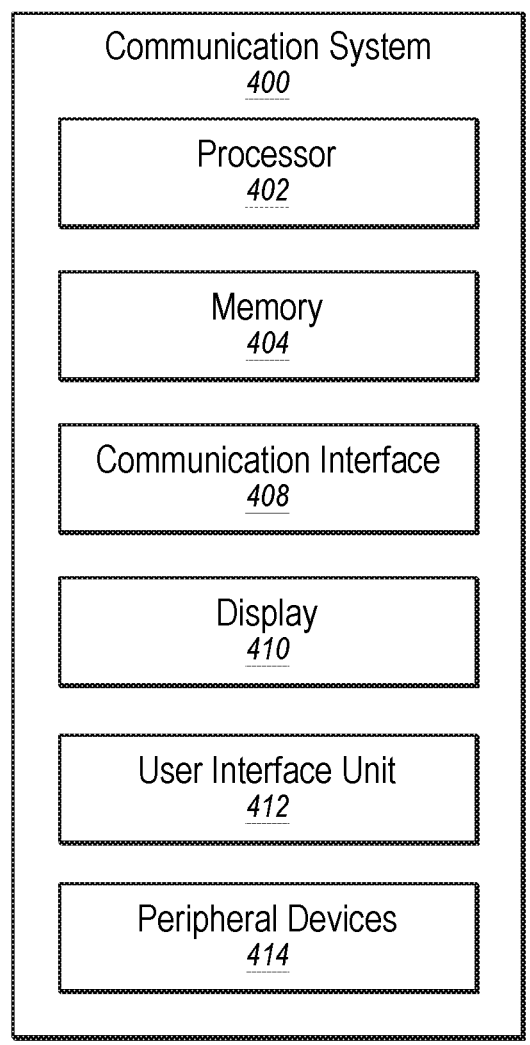
FIG. 4 illustrates an example communication device that may be used in storing messages.

FIG. 4 illustrates an example communication device 400 that may be used in storing messages. The communication device 400 may be arranged in accordance with at least one embodiment described in the present disclosure. The communication device 400 may include a processor 402, a memory 404, a communication interface 408, a display 410, a user interface unit 412, and a peripheral device 414, which all may be communicatively coupled. In some embodiments, the communication device 400 may be part of any of the systems or devices described in this disclosure. For example, the communication device 400 may be part of any of the first communication device 104, the second communication device 110, or the communication system 108 of FIG. 1. In some embodiments, the communication device 400 may be part of a phone console.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof.

Although illustrated as a single processor in FIG. 4, it is understood that the processor 402 may include any number of processors distributed across any number of networks or physical locations that are configured to perform individually or collectively any number of operations described herein. In some embodiments, program instructions may be loaded into the memory 404. In these and other embodiments, the processor 402 may interpret and/or execute program instructions and/or process data stored in the memory 404. For example, the communication device 400 may be part of the first communication device 104, the second communication device 110, or the communication system 108 of FIG. 1. In these and other embodiments, the program instructions may include the processor 402 storing messages on the memory 404.

The memory 404 may include computer-readable storage media for carrying or having computer-executable instructions or data structures stored thereon. Such computer-readable storage media may be any available media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. The computer-readable storage media may include computer-writable storage media including Random Access Memory (RAM), optical disk storage, magnetic disk storage or other magnetic storage devices, flash memory devices (e.g., solid state memory devices), or any other storage media which may be modified or written to by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more blocks of the method 700, the method 800, or the method 900. The computer-readable storage of the memory 404 may be configured to store audio messages and video messages in response to a communication session not being established between a first communication device and a user of a second communication device.

The communication interface 408 may include any component, device, system, or combination thereof that is configured to transmit or receive information over a network. In some embodiments, the communication interface 408 may communicate with other devices at other locations, the same location, or even other components within the same system. For example, the communication interface 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), plain old telephone service (POTS), and/or the like. The communication interface 408 may permit data to be exchanged with a network and/or any other devices or systems described in the present disclosure.

The display 410 may be configured as one or more displays, like an LCD, LED, or other type display. The display 410 may be configured to present video, text captions, user interfaces, and other data as directed by the processor 402.

The user interface unit 412 may include any device to allow a user to interface with the communication device 400. For example, the user interface unit 412 may include a mouse, a track pad, a keyboard, a touchscreen, a telephone switch hook, a telephone keypad, volume controls, and/or other special purpose buttons, among other devices. The user interface unit 412 may receive input from a user and provide the input to the processor 402.

The peripheral devices 414 may include one or more devices. For example, the peripheral devices may include a microphone, an imager, and/or a speaker, among other peripheral devices. In these and other embodiments, the microphone may be configured to capture audio. The imager may be configured to capture digital images. The digital images may be captured in a manner to produce video or image data. In some embodiments, the speaker may play audio received by the communication device 400 or otherwise generated by the communication device 400.

Modifications, additions, or omissions may be made to the communication device 400 without departing from the scope of the present disclosure.

Figure 5A:
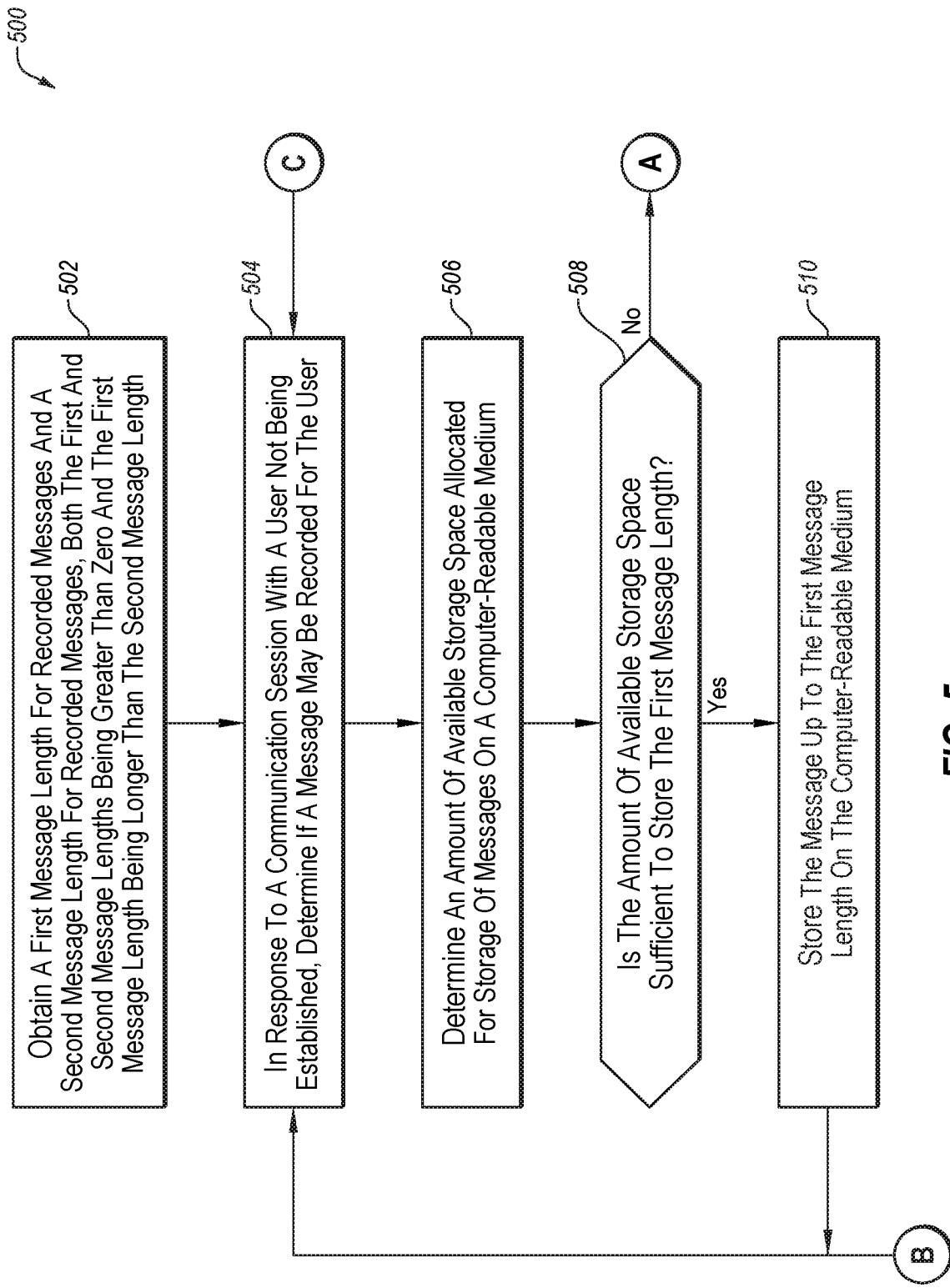
FIGS. 5a and 5b illustrates an example process related to storing messages.
Figure 5B:
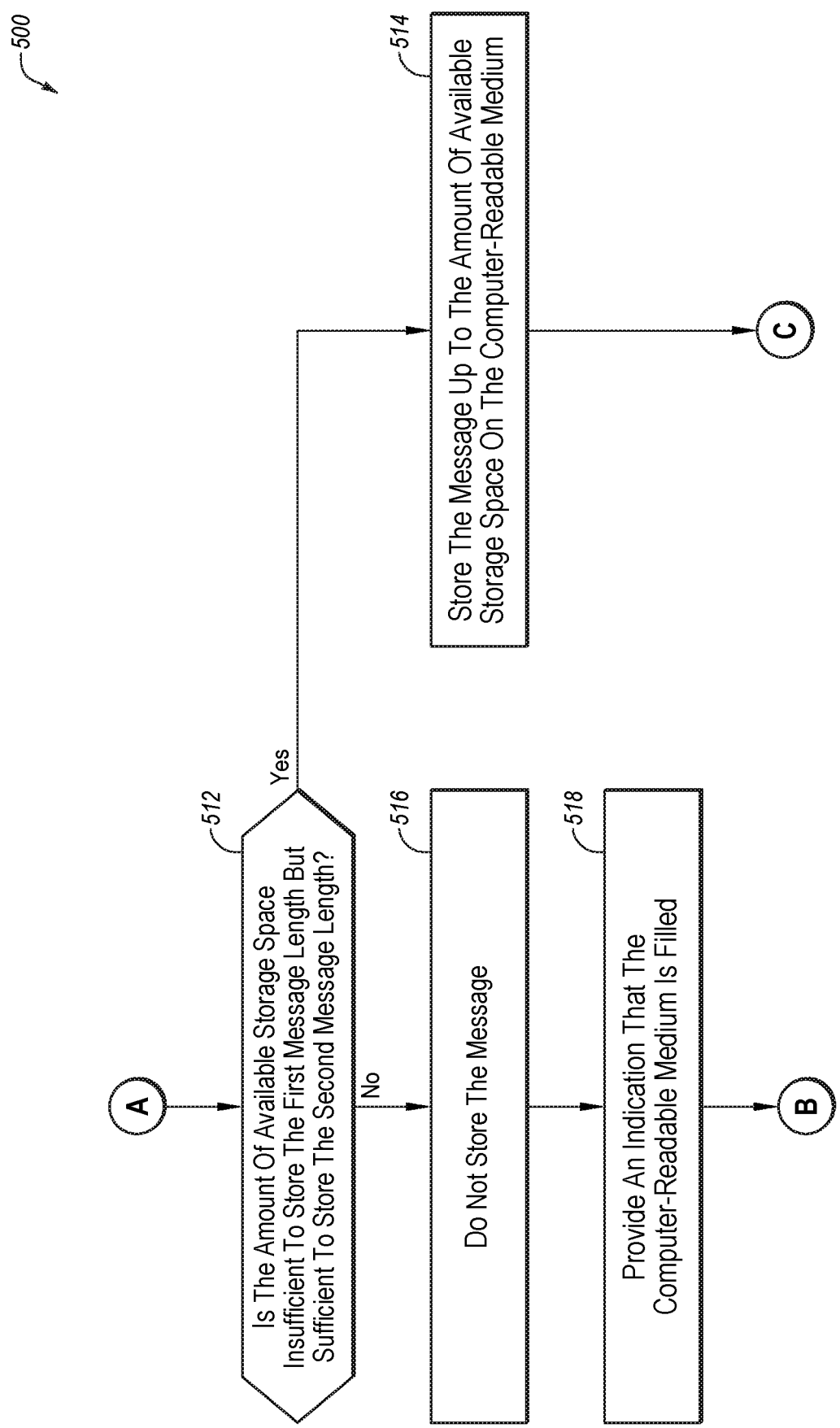

FIGS. 5*a* and 5*b* illustrates an example process related to storing messages. The process 500 may be arranged in accordance with at least one embodiment described in the present disclosure. The process 500 may be performed, in whole or in part, in some embodiments, by a system and/or environment, such as the environment 100 and/or the communication device 400 of FIGS. 1 and 4, respectively. In these and other embodiments, the process 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The process 500 may begin at block 502, where a first message length for recorded audio messages and a second message length for recorded audio messages may be obtained. Both the first and second message lengths may be greater than zero and the first message length may be longer than the second message length. The first message length may be a maximum message length for storage of messages. The second message length may be a threshold message length for storage of messages. The first and second message lengths may be durations of time.

In block 504, it may be determined that a communication session with a user is not established. When a communication session with a user is not established, the process 500 may determine if a message may be recorded for the user and the process 500 may proceed to block 506.

In block 506, an amount of available storage space allocated for storage of messages on a computer-readable medium may be determined. In some embodiments, the computer-readable medium may be part of the first communication device. Alternatively or additionally, the computer-readable medium may be part of the communication system or may be a computer-readable medium communicatively coupled with the first communication device via a network. In some embodiments, the amount of available storage space may be determined by comparing an amount of used space allocated for storage of messages on the computer-readable medium with a total amount of storage space allocated for storage of messages on the computer-readable medium.

In block 508, it may be determined if the amount of available storage space is sufficient to store the first message length. In some embodiments, the amount of storage space required per length of time may differ depending on the type of message to be stored. For example, in some embodiments, a video message may occupy more storage space per minute than an audio message occupies. In some embodiments, the amount of storage space required per length of time may differ for each individual message. For example, a message with little variation in audio tones or repetition in audio signals may be able to be compressed more and may occupy less storage space per minute than a message with more variation in audio tones or less repetition. If the messages are stored using a variable bit rate compression algorithm, each message may occupy a different amount of storage space per minute. Because the determination of whether the amount of available storage space is sufficient to store the first message length may occur prior to receiving data from a message, the determination may be based on an estimated storage requirement for a message of the first message length. Alternatively or additionally, in some embodiments, the determination may be based on a maximum storage requirement for a message of the first length. In response to the amount of available storage space being sufficient to store the first message length ("Yes" at block 508), the process 500 may proceed to block 510. In response to the amount of available storage space being insufficient to store the first message length ("No" at block 508), the process 500 may proceed to block 512.

In block 510, the message may be stored up to the first message length on the computer-readable medium. The first communication device or communication system may store the message obtained during the communication session on the computer-readable medium. After the message ends or after a duration of time equivalent to the first message length, the first communication device or communication system may cease to store the message. For example, if the message ends prior to a duration of time equivalent to the first message length, the entire message may be stored on the computer-readable medium. If a duration of time equivalent to the first message length passes during storage of the message, the message may be stored up to the first message length on the computer-readable medium. An indication may be provided that the message has stopped being stored. The process may return to block 504.

In block 512, it may be determined if the amount of available storage space is insufficient to store the first message length but sufficient to store the second message length. As discussed above, in some embodiments, the amount of storage space required per length of time may differ depending on the type of message to be stored and may differ for each individual message. Because the determination of whether the amount of available storage space is sufficient to store the second message length may occur prior to receiving data from a message, the determination may be based on an estimated storage requirement for a message of the second message length. Alternatively or additionally, in some embodiments, the determination may be based on a maximum storage requirement for a message of the second length. In response to the amount of available storage space being insufficient to store the first message length but sufficient to store the second message length ("Yes" at block 512), the process may proceed to block 514. In response to the amount of available storage space not being sufficient to store the second message length ("No" at block 512), the process may proceed to block 516.

In block 514, the message may be stored up to the amount of available storage space on the computer-readable medium. The first communication device or communication system may store a message obtained during the communication session on the computer-readable medium. After the message ends or when the amount of storage used by the message is equivalent to the amount of available storage space on the computer-readable medium, the first communication device or communication system may cease to store the message. For example, if the message ends prior to the amount of storage used by the message being equivalent to the amount of available storage space, the entire message may be stored on the computer-readable medium. If the amount of storage space used by the message equals the amount of available storage space, the message may be stored up to the amount of available storage space on the computer-readable medium. An indication may be provided that the message has stopped being stored. The process may return to block 504.

In block 516, the message may not be stored. In some embodiments, the message may not be stored even though there may be available storage space allocated for storage of messages on the computer-readable medium. For example, the available storage space may be sufficient to store a message of length less than the second message length. For example, the second message length may be ninety seconds and the available storage space may be sufficient to store a message of length sixty seconds. Even though the available storage space is sufficient to store a message, the message may not be stored because the available storage space is insufficient to store a message of the second message length. In block 518, an indication that there is no available storage space may be provided. The process may return to block 504.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. For example, the block 506 may be performed prior to block 504. Alternatively or additionally, the process 500 may further include generating a transcription of the stored messages.

Figure 6A:
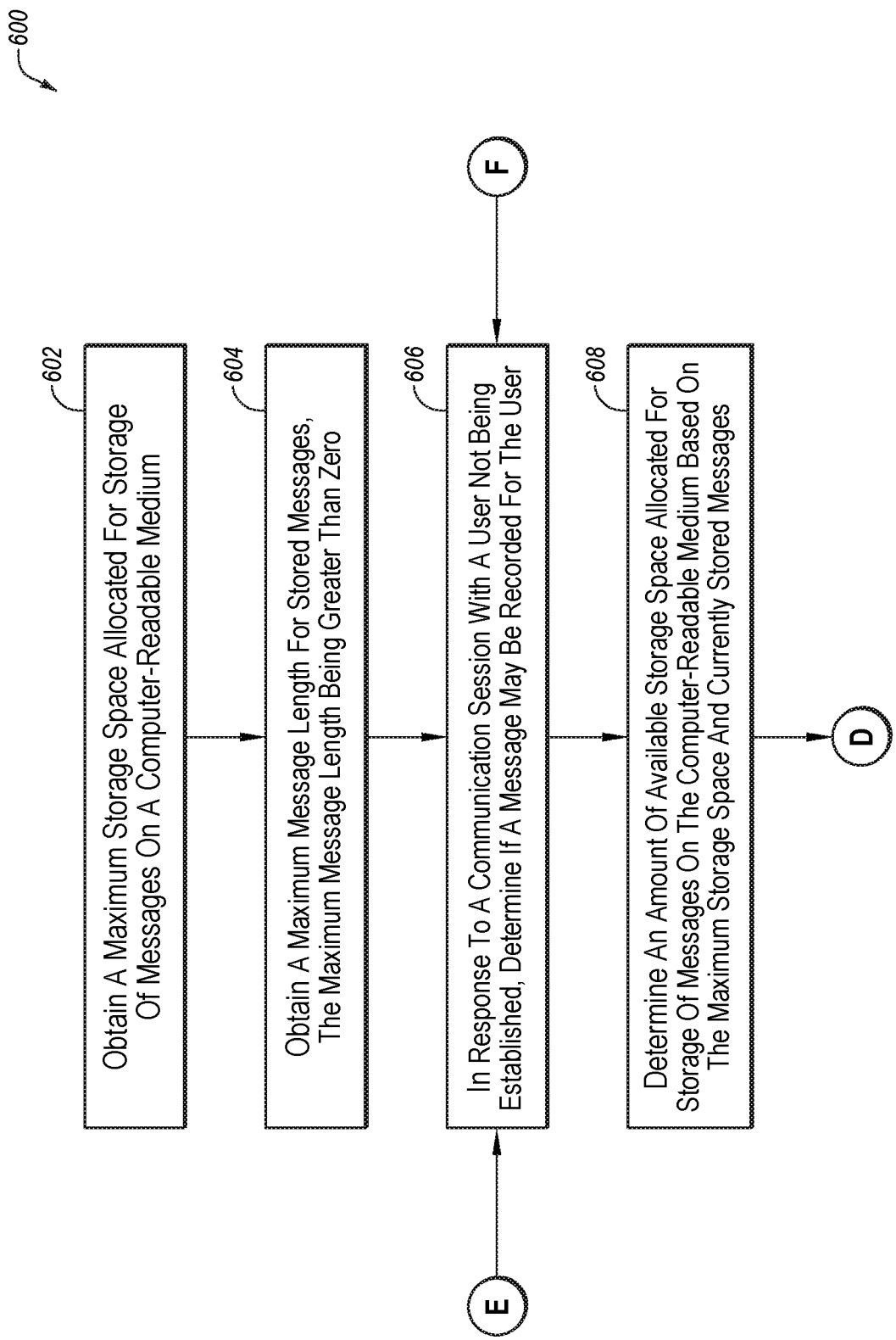
FIGS. 6a and 6b illustrates another example process related to storing messages.
Figure 6B:
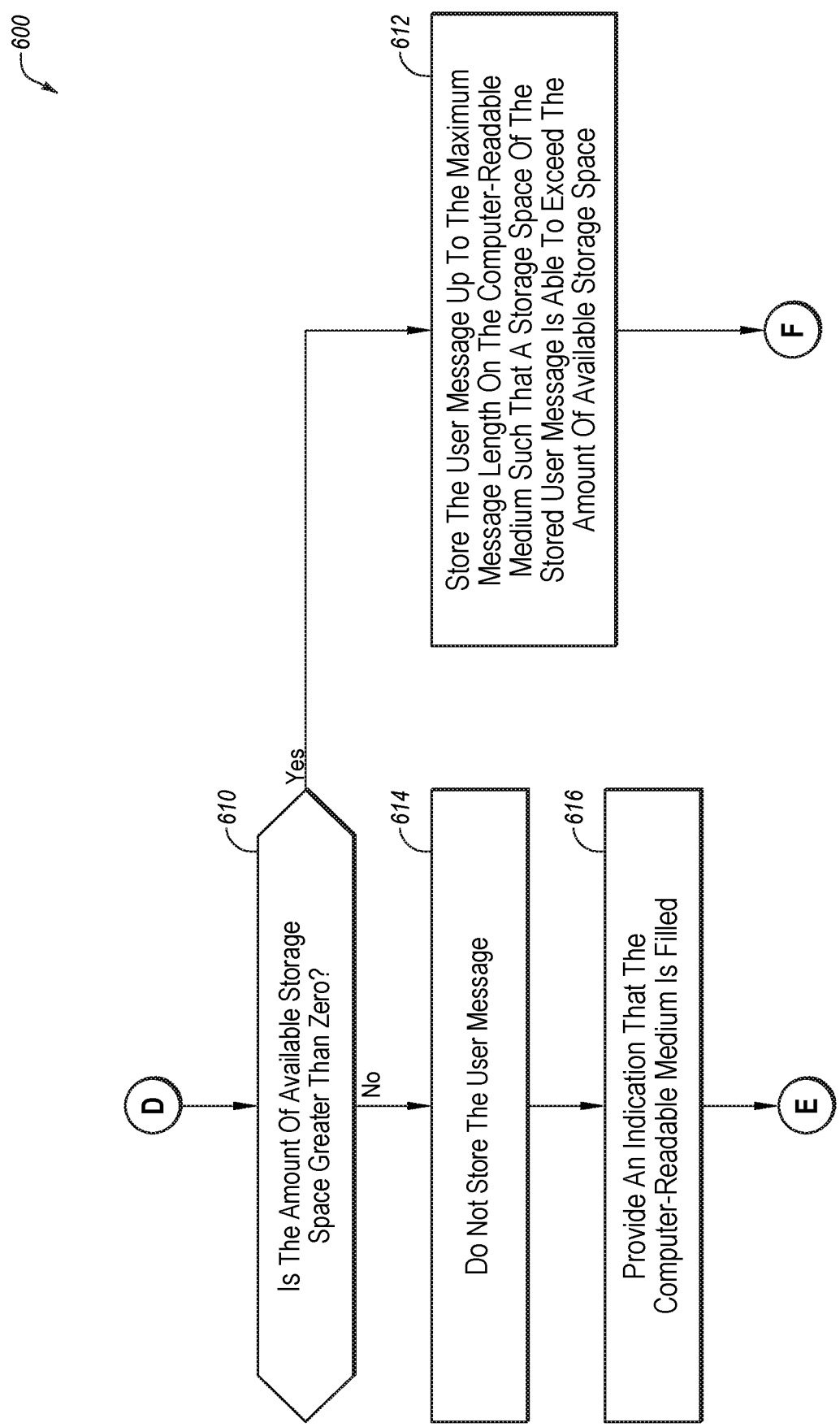

FIGS. 6a and 6b illustrates an example process related to storing messages. The process 600 may be arranged in accordance with at least one embodiment described in the present disclosure. The process 600 may be performed, in whole or in part, in some embodiments, by a system and/or environment, such as the environment 100 of FIG. 1 and/or the communication device 400 of FIG. 4, respectively. In these and other embodiments, the process 600 may be performed based on the execution of instructions stored on one or more non-transitory computer-readable media. Although illustrated as discrete blocks, various blocks may be divided into additional blocks, combined into fewer blocks, or eliminated, depending on the desired implementation.

The process 600 may begin at block 602, where a maximum storage space allocated for storage of messages on a computer-readable medium may be obtained. In some embodiments, the maximum storage space allocated for storage of messages may be a size for a storage space. Alternatively or additionally, the maximum storage space may be a length of time for all of the messages stored in the storage space. The total storage size or the total length of time of messages stored on the computer-readable medium may be limited to the maximum storage space.

In block 604, a maximum message length for stored messages may be obtained. The maximum message length may be greater than zero. The maximum message length may be a duration of time. The maximum message length may be the maximum length for messages stored on the computer-readable medium. For example, each message stored on the computer-readable medium may be limited to a length less than or equal to the maximum message length.

In block 606, it may be determined that a communication session with a user is not established. When a communication session with a user is not established, the process 600 may determine if a message may be recorded for the user and the process 600 may proceed to block 608.

In block 608, an amount of available storage space allocated for storage of messages on the computer-readable medium may be determined based on the maximum storage space and currently stored messages. In some embodiments, the amount of available storage space may be determined by comparing an amount of storage space for currently stored messages on the computer-readable medium with the maximum storage space.

In block 610, it may be determined if the amount of available storage space is greater than zero. In response to the amount of available storage space being greater than zero ("Yes" at block 610), the process 600 may proceed to block 612. In response to the amount of available storage space not being greater than zero ("No" at block 610), the process 600 may proceed to block 614.

In block 612, the user message may be stored up to the maximum message length on the computer-readable medium such that a storage space of the stored user message is able to exceed the amount of available storage space allocated for storage of messages. The communication device or communication system may store a message obtained during the communication session on the computer-readable medium. After the message ends or after a duration of time equivalent to the maximum message length, the communication device or communication system may cease to store the message. For example, if the message ends prior to a duration of time equivalent to the maximum message length, the entire message may be stored on the computer-readable medium. If a duration of time equivalent to the maximum message length passes during storage of the message, the message may be stored up to the maximum message length on the computer-readable medium. In some embodiments, an indication may be provided that the message has stopped being stored. In some embodiments, the message may be stored on the computer-readable medium up to the maximum message length even though the currently stored messages with the stored message may exceed the amount of available storage space allocated for storage of messages. For example, the maximum storage space may be sufficient to store sixty-five minutes of messages. The available storage space allocated for storage of messages may be sufficient to store a three minute message. The currently stored messages may total sixty-two minutes in length. The maximum message length may be five minutes. In response to a communication session not being established between a user of the first communication device and the second communication device, a message up to five minutes in length may be stored. The currently stored messages may have a length of sixty-seven minutes, which is longer than the maximum storage space. The process may return to block 606.

In block 614, the user message may not be stored. In block 616, an indication that there is no available storage space may be provided. The process may return to block 606.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. For example, block 606 may be performed prior to blocks 602 and 604. Alternatively or additionally, the process 600 may further include generating transcriptions of the user message.

Figure 7A:
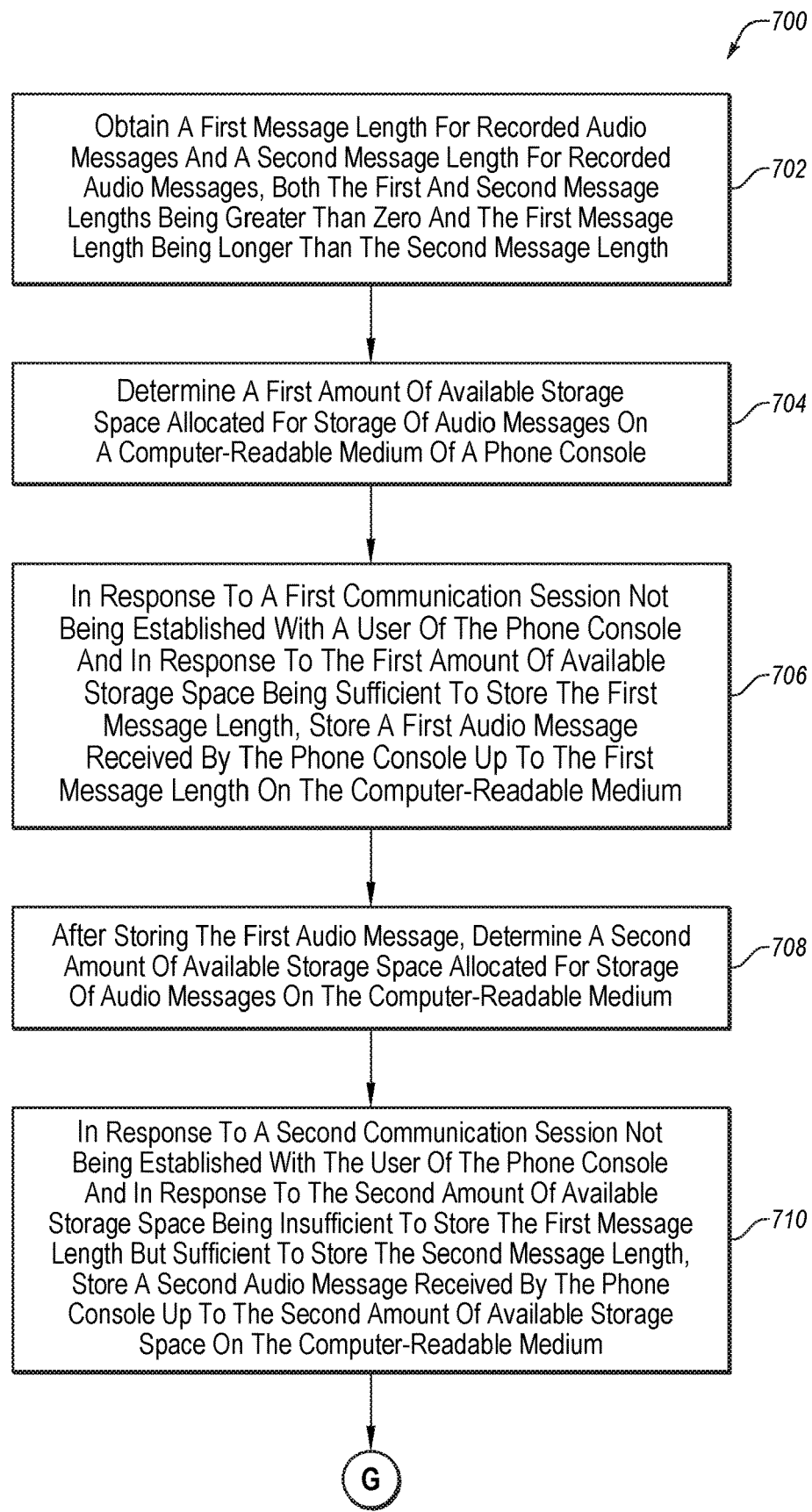
FIGS. 7a and 7b illustrate a flowchart of an example computer-implemented method to store messages.
Figure 7B:
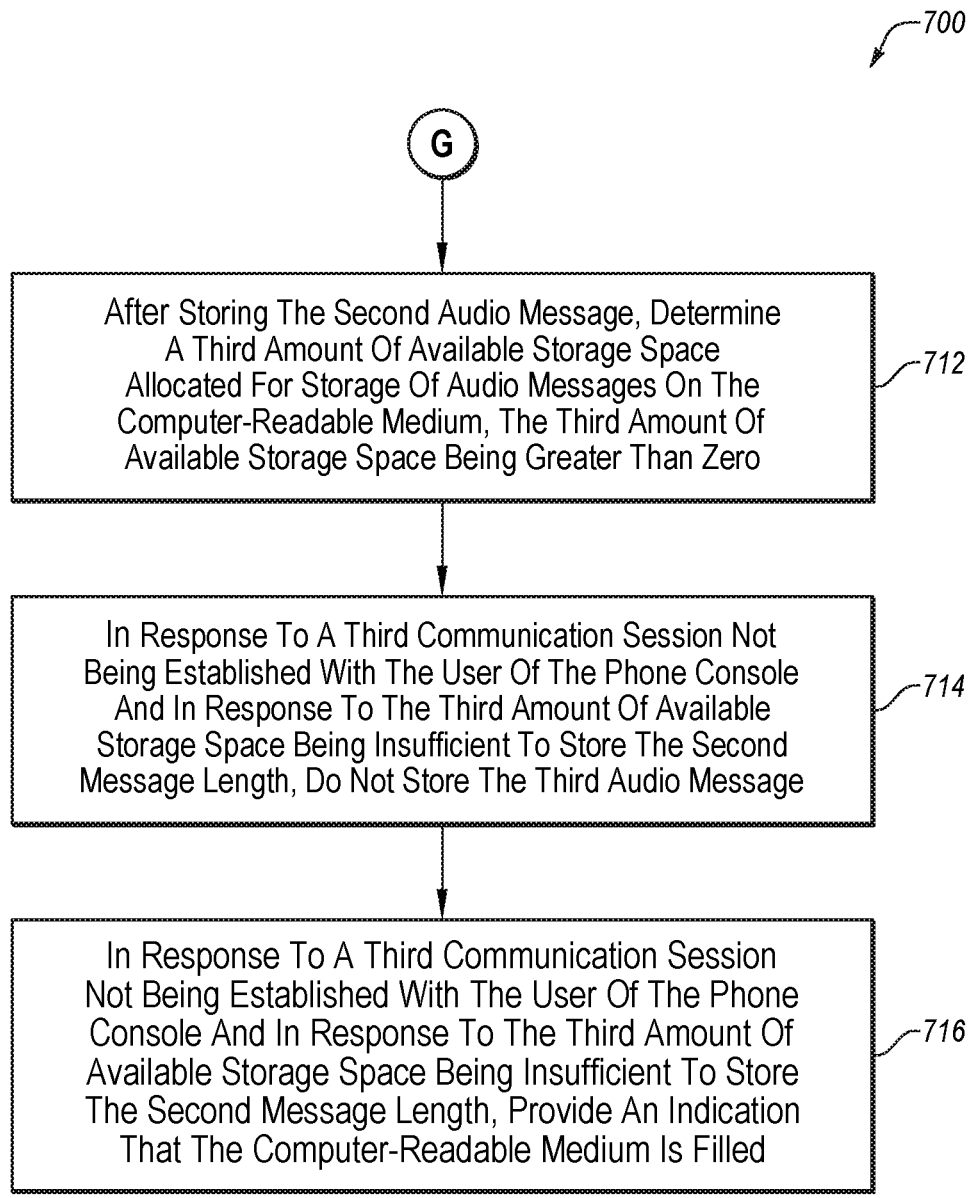

FIGS. 7a and 7b illustrate a flowchart of an example computer-implemented method to store messages. The method 700 may be arranged in accordance with at least one embodiment described in the present disclosure. The method 700 may be performed, in whole or in part, in some embodiments, by a system and/or environment, such as the environment 100 and/or the communication device 400 of FIGS. 1 and 4, respectively. In these and other embodiments, the method 700 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 700 may begin at block 702, where a first message length for recorded audio messages and a second message length for recorded audio messages may be obtained. Both the first and second message lengths may be greater than zero and the first message length may be longer than the second message length. In some embodiments, the first message length may be three minutes. In some embodiments, the second message length may be one minute.

In block 704, a first amount of available storage space allocated for storage of audio messages on a computer-readable medium of a phone console configured to receive phone calls and store audio messages may be determined. In block 706, in response to a first communication session not being established with a user of the phone console and in response to the first amount of available storage space being sufficient to store the first message length, a first audio message received by the phone console may be stored up to the first message length on the computer-readable medium. In some embodiments, the first audio message may include voice data.

In block 708, after storing the first audio message, a second amount of available storage space allocated for storage of audio messages on the computer-readable medium may be determined. In block 710, in response to a second communication session not being established with the user of the phone console and in response to the second amount of available storage space being insufficient to store the first message length but sufficient to store the second message length, a second audio message received by the phone console may be stored up to the second amount of available storage space on the computer-readable medium. In some embodiments, the second audio message may include voice data.

In block 712, after storing the second audio message, a third amount of available storage space allocated for storage of audio messages on the computer-readable medium may be determined. The third amount of available storage space may be greater than zero. In block 714, in response to a third communication session not being established with the user of the phone console and in response to the third amount of available storage space being insufficient to store the second message length, a third audio message may not be stored. In some embodiments, the third audio message may include voice data. In block 716, in response to a third communication session not being established with the user of the phone console and in response to the third amount of available storage space being insufficient to store the second message length, an indication that there is no available storage space may be provided.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, the method 700 may further include obtaining a voice transcription of the first audio message or the second audio message. In these and other embodiments, the method 700 may further include presenting the voice transcription on a display of the phone console.

Figure 8:
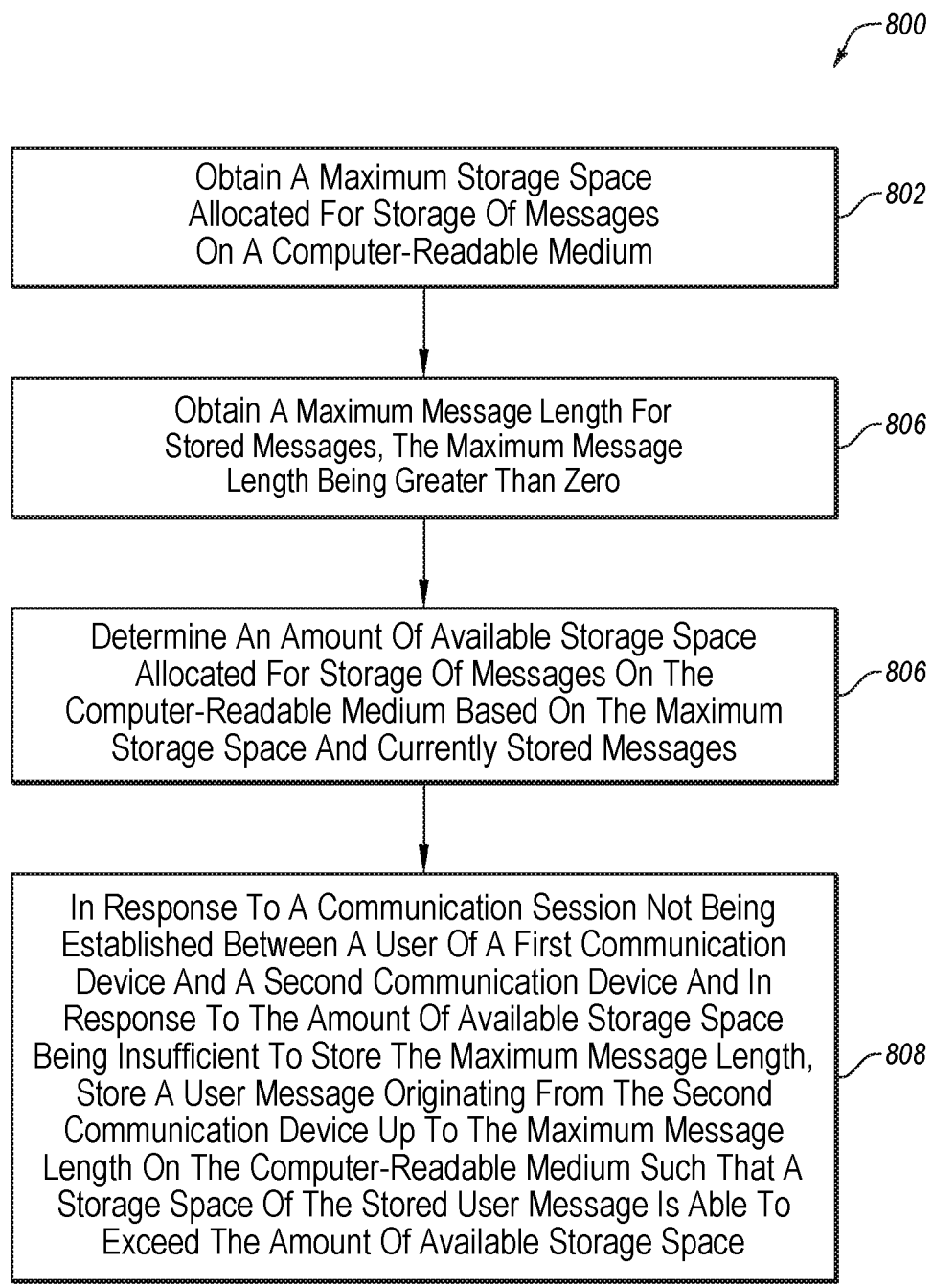
FIG. 8 is a flowchart of another example computer-implemented method to store messages.

FIG. 8 is a flowchart of an example computer-implemented method to store messages. The method 800 may be arranged in accordance with at least one embodiment described in the present disclosure. The method 800 may be performed, in whole or in part, in some embodiments, by a system and/or environment, such as the environment 100 and/or the communication device 400 of FIGS. 1 and 4, respectively. In these and other embodiments, the method 800 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 800 may begin at block 802, where a maximum storage space allocated for storage of messages on a computer-readable medium may be obtained. In some embodiments, the maximum storage space allocated for storage of messages may be sufficient to store sixty minutes of messages. In block 804, a maximum message length for stored messages may be obtained. The maximum message length may be greater than zero. In some embodiments, the maximum message length may be three minutes.

In block 806, an amount of available storage space allocated for storage of messages on the computer-readable medium may be determined based on the maximum storage space and currently stored messages. In block 808, in response to a communication session not being established between a user of a first communication device and a second communication device and in response to the amount of available storage space being insufficient to store the maximum message length, a user message originating from the second communication device may be stored up to the maximum message length on the computer-readable medium such that a storage space of the stored user message may be able to exceed the amount of available storage space allocated for storage of messages. In some embodiments, the user message may be an audio message. In some embodiments, the computer-readable medium may be located outside the first communication device.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, the method 800 may further include determining a second amount of available storage space allocated for storage of messages on the computer-readable medium based on the maximum storage space and currently stored messages after storing the user message. In these and other embodiments, the method 800 may further include, in response to a second communication session not being established between a user of the first communication device and a third communication device and in response to the second amount of available storage space being zero, not storing a second user message and providing an indication that there is no available storage space.

Alternatively or additionally, in some embodiments, the method 800 may further include obtaining a voice transcription of the user message. In these and other embodiments, the method 800 may further include presenting the voice transcription on a display of the first communication device.

Figure 9:
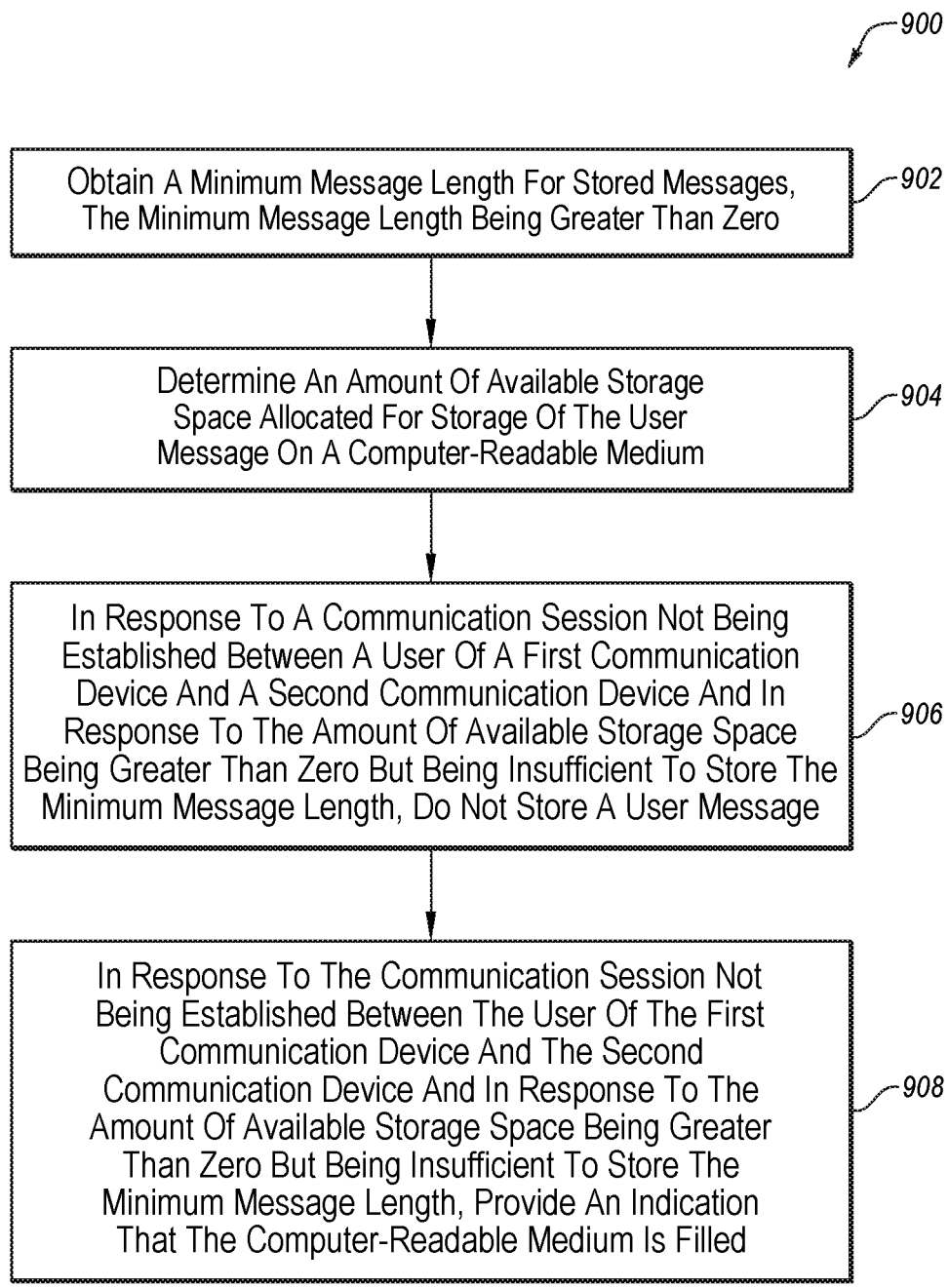
FIG. 9 is a flowchart of another example computer-implemented method to store messages.

FIG. 9 is a flowchart of another example computer-implemented method to store messages. The method 900 may be arranged in accordance with at least one embodiment described in the present disclosure. The method 900 may be performed, in whole or in part, in some embodiments, by a system and/or environment, such as the environment 100 and/or the communication device 400 of FIGS. 1 and 4, respectively. In these and other embodiments, the method 900 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 900 may begin at block 902, where a minimum message length for stored messages may be obtained. The minimum message length may be greater than zero. In some embodiments, the minimum message length may be one minute. In block 904, an amount of available storage space allocated for storage of user messages on a computer-readable medium may be determined. In block 906, in response to a communication session not being established between a user of a first communication device and a second communication device and in response to the amount of available storage space being greater than zero but being insufficient to store the minimum message length, a user message may not be stored. In some embodiments, the user message may be an audio message. In some embodiments, the computer-readable medium may be located outside the first communication device. In block 908, in response to the communication session not being established between the user of the first communication device and the second communication device and in response to the amount of available storage space being greater than zero but being insufficient to store the minimum message length, an indication that there is no available storage space may be provided.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, the method 900 may further include deleting a stored message from the computer readable medium. The method 900 may further include obtaining a maximum message length for stored messages. The maximum message length may be greater than zero. The maximum message length may be longer than the minimum message length. In some embodiments, the maximum message length may be three minutes and the minimum message length may be one minute. The method 900 may further include determining a second amount of available storage space allocated for storage of user messages on the computer-readable medium after deleting the stored message from the computer-readable medium. In these and other embodiments, the method 900 may further include, in response to a second communication session not being established with the user of the first communication device and a third communication device and in response to the second amount of available storage space being insufficient to store the maximum message length but sufficient to store the minimum message length, storing a second user message originating from the third communication device on the computer-readable medium up to the second amount of available storage space on the computer-readable medium.

In some embodiments, a communication device may be configured to store messages. The communication device may include a computer-readable medium and a communication interface configured to: establish communication sessions; and obtain a user message in response to a communication session not being established between a user of the communication device and a second communication device, the user message originating from the second communication device. The communication device may also include one or more processors configured to: obtain a maximum storage space allocated for storage of messages on the computer-readable medium; obtain a maximum message length for stored messages, the maximum message length being greater than zero; determine an amount of available storage space allocated for storage of messages on the computer-readable medium based on the maximum storage space and currently stored messages; and in response to the amount of available storage space being insufficient to store the maximum message length, directing the computer-readable medium to store the user message up to the maximum message length on the computer-readable medium such that a storage space of the stored user message is able to exceed the amount of available storage space allocated for storage of messages. In some embodiments, the communication device may further include a display and wherein the one or more processors are further configured to obtain a voice transcription of the user message and wherein the display is configured to present the voice transcription.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 of FIG. 4) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A computer-implemented method to store messages, the method comprising:
   obtaining a maximum storage space allocated for storage of messages on a computer-readable medium;
   obtaining a maximum message length, the maximum message length indicating a maximum duration of time of a single message that is to be stored on the computer-readable medium and being greater than zero;
   determining an amount of available storage space allocated for storage of messages on the computer-readable medium based on the maximum storage space and currently used storage space that stores currently stored messages, the maximum message length obtained independent of the currently used storage space and the amount of available storage space; and
   in response to a user of a first communication device providing a user message for a user of a second communication device after failing to establish communication with the user of the second communication device and in response to the amount of available storage space being insufficient to store the maximum message length, storing the user message up to the maximum message length on the computer-readable medium such that a storage space of the stored user message is able to exceed the amount of available storage space allocated for storage of messages when the computer-readable medium includes additional storage space.

2. The method of claim 1, further comprising:
   after storing the user message, determining a second amount of available storage space allocated for storage of messages on the computer-readable medium based on the maximum storage space and the currently used storage space; and
   in response to a second communication session not being established between the user of the second communication device and a third communication device and in response to the second amount of available storage space being zero or less than zero:
   not storing a second user message; and providing an indication that there is no available storage space.

3. The method of claim 1, wherein the maximum storage space allocated for storage of messages is sufficient to store sixty minutes of messages and the maximum message length is three minutes.

4. The method of claim 1, wherein the computer-readable medium is part of the second communication device.

5. The method of claim 1, wherein the computer-readable medium is located outside of the second communication device.

6. The method of claim 1, further comprising:
   obtaining a voice transcription of the user message; and
   presenting the voice transcription on a display of the second communication device.

7. The method of claim 1, wherein the user message is an audio message.

8. The method of claim 1, wherein a total amount of storage space of the computer-readable medium is greater than the maximum storage space allocated for storage of messages.

9. At least one non-transitory computer-readable media configured to store one or more instructions that when executed by at least one computing system cause or direct the at least one computing system to perform operations, the operations comprising:
   obtain a maximum storage space allocated for storage of messages on a computer-readable medium;
   obtain a maximum message length, the maximum message length indicating a maximum duration of time of a single message that is to be stored on the computer-readable medium and being greater than zero;
   determine an amount of available storage space allocated for storage of messages on the computer-readable medium based on the maximum storage space and currently used storage space that stores currently stored messages, the maximum message length obtained independent of the currently used storage space and the amount of available storage space; and
   in response to a user of a first communication device providing a user message for a user of a second communication device after failing to establish communication with the user of the second communication device and in response to the amount of available storage space being insufficient to store the maximum message length, storing the user message up to the maximum message length on the computer-readable medium such that a storage space of the stored user message is able to exceed the amount of available storage space allocated for storage of messages when the computer-readable medium includes additional storage space.

10. The non-transitory computer-readable media of claim 9, wherein the operations further comprise:
    after storing the user message, determine a second amount of available storage space allocated for storage of messages on the computer-readable medium based on the maximum storage space and the currently used storage space; and
    in response to a second communication session not being established between the user of the second communication device and a third communication device and in response to the second amount of available storage space being zero or less than zero: not storing a second user message; and provide an indication that there is no available storage space.

11. The non-transitory computer-readable media of claim 9, wherein the maximum storage space allocated for storage of messages is sufficient to store sixty minutes of messages and the maximum message length is three minutes.

12. The non-transitory computer-readable media of claim 9, wherein the computer-readable medium is part of the second communication device.

13. The non-transitory computer-readable media of claim 9, wherein the operations further comprise:
    obtain a voice transcription of the user message; and
    present the voice transcription on a display of the second communication device.

14. The non-transitory computer-readable media of claim 9, wherein the user message is an audio message.

15. The non-transitory computer-readable media of claim 9, wherein a total amount of storage space of the computer-readable medium is greater than the maximum storage space allocated for storage of messages.

16. A communication console comprising:
- at least one non-transitory computer-readable media configured to store one or more instructions and user messages;
- at least one processor communicatively coupled to the at least one non-transitory computer-readable media, the at least one processor configured to execute the one or more instructions to cause or direct the communication console to perform operations, the operations comprising:
    - obtain a maximum storage space allocated for storage of messages on the at least one non-transitory computer-readable media;
    - obtain a maximum message length, the maximum message length indicating a maximum duration of time of a single message that is to be stored on the at least one non-transitory computer-readable media and being greater than zero;
    - determine an amount of available storage space allocated for storage of messages on the at least one non-transitory computer-readable media based on the maximum storage space and currently used storage space that stores currently stored messages, the maximum message length obtained independent of the currently used storage space and the amount of available storage space; and
    - in response to a user of a first communication device providing a user message for a user of the communication console after failing to establish communication with the user of the communication console and in response to the amount of available storage space being insufficient to store the maximum message length, store the user message up to the maximum message length on the at least one non-transitory computer-readable media such that a storage space of the stored user message is able to exceed the amount of available storage space allocated for storage of messages when the at least one non-transitory computer-readable media includes additional storage space.

17. The communication console of claim 16, wherein the operations further comprise:
- after storing the user message, determine a second amount of available storage space allocated for storage of messages on the at least one non-transitory computer-readable media based on the maximum storage space and the currently used storage space; and
- in response to a second communication session not being established between the user of the communication console and a second communication device and in response to the second amount of available storage space being zero or less than zero:
    - not storing a second user message; and
    - provide an indication that there is no available storage space.

18. The communication console of claim 16, wherein the maximum storage space allocated for storage of messages is sufficient to store sixty minutes of messages and the maximum message length is three minutes.

19. The communication console of claim 16, further comprising a display coupled to the processor, wherein the operations further comprise:
- obtain a voice transcription of the user message; and
- present the voice transcription on the display.

20. The communication console of claim 16, wherein the user message is an audio message.

* * * * *